United States Patent
Boroson et al.

(10) Patent No.: US 10,003,402 B2
(45) Date of Patent: Jun. 19, 2018

(54) GROUND TERMINAL DESIGN FOR HIGH RATE DIRECT TO EARTH OPTICAL COMMUNICATIONS

(71) Applicants: Don M. Boroson, Needham, MA (US); Bryan S. Robinson, Arlington, MA (US); Daniel V. Murphy, Concord, MA (US); Jason Stewart, Stow, MA (US); Farzana I. Khatri, Lexington, MA (US); Steven Constantine, Westford, MA (US); David Jason Geisler, Watertown, MA (US); Timothy M. Yarnall, Amherst, NH (US); Zachary Darling, Somerville, MA (US)

(72) Inventors: Don M. Boroson, Needham, MA (US); Bryan S. Robinson, Arlington, MA (US); Daniel V. Murphy, Concord, MA (US); Jason Stewart, Stow, MA (US); Farzana I. Khatri, Lexington, MA (US); Steven Constantine, Westford, MA (US); David Jason Geisler, Watertown, MA (US); Timothy M. Yarnall, Amherst, NH (US); Zachary Darling, Somerville, MA (US)

(73) Assignee: Massachusetts Institute Technology, Cambridge, MA (US)

(*) Notice: Subject to any disclaimer, the term of this patent is extended or adjusted under 35 U.S.C. 154(b) by 121 days.

(21) Appl. No.: 14/991,386

(22) Filed: Jan. 8, 2016

(65) Prior Publication Data
US 2016/0204866 A1 Jul. 14, 2016

Related U.S. Application Data

(60) Provisional application No. 62/101,976, filed on Jan. 9, 2015, provisional application No. 62/101,975, filed
(Continued)

(51) Int. Cl.
H04B 10/00 (2013.01)
H04B 10/118 (2013.01)
(Continued)

(52) U.S. Cl.
CPC ....... *H04B 10/118* (2013.01); *H04B 7/18513* (2013.01); *H04B 10/1121* (2013.01);
(Continued)

(58) Field of Classification Search
CPC .............. H04B 10/118; H04B 7/18513; H04B 10/1121; H04B 10/29; H04B 10/40; H04B 10/61; H04J 14/02
(Continued)

(56) References Cited

U.S. PATENT DOCUMENTS 5,367,371 A 11/1994 Krawczyk
5,450,223 A * 9/1995 Wagner .............. H04Q 11/0003
398/1
(Continued)

FOREIGN PATENT DOCUMENTS

CA 2794400 A1 10/2011
EP 2073404 A1 6/2009

OTHER PUBLICATIONS

International Search Report and Written Opinion dated Feb. 24, 2016 from International Application No. PCT/US2015/043638.
(Continued)

*Primary Examiner* — Amritbir Sandhu
(74) *Attorney, Agent, or Firm* — Cooley LLP

(57) ABSTRACT

Challenges of direct-to-Earth (DTE) laser communications (lasercom) between spacecraft in low-Earth orbit (LEO) or medium-Earth orbit (MEO) and ground terminals can include short duration transmission windows, long time gaps between the transmission windows, deleterious effects of atmospheric turbulence, and the inability to operate in
(Continued)

cloudy weather. Direct-link optical communications systems described herein can have data rates that are high enough to empty high-capacity on-board buffer(s) (e.g., having a capacity of at least about 1 Tb to hundreds of Tb) of a spacecraft in a single pass lasting only tens of seconds to a few minutes (e.g., 1-15 minutes), and overprovisioning the buffer capacity accounts for variations in the latency between links. One or more distributed networks of compact optical ground terminals, connected via terrestrial data networks, receive and demodulate WDM optical data transmissions from a plurality of orbiting spacecraft (e.g., satellites).

20 Claims, 21 Drawing Sheets

Related U.S. Application Data on Jan. 9, 2015, provisional application No. 62/101,955, filed on Jan. 9, 2015.

(51) Int. Cl.
| | |
|---|---|
| *H04B 10/112* | (2013.01) |
| *H04J 14/02* | (2006.01) |
| *H04B 7/185* | (2006.01) |
| *H04B 10/29* | (2013.01) |
| *H04B 10/40* | (2013.01) |
| *H04B 10/61* | (2013.01) |

(52) U.S. Cl.
CPC ............. *H04B 10/29* (2013.01); *H04B 10/40* (2013.01); *H04B 10/61* (2013.01); *H04J 14/02* (2013.01)

(58) Field of Classification Search
USPC .................................................. 398/118–131
See application file for complete search history.

(56) References Cited

U.S. PATENT DOCUMENTS

| | | | |
|---|---|---|---|
| 5,508,932 A | 4/1996 | Achkar et al. | |
| 5,710,652 A | 1/1998 | Bloom et al. | |
| 5,903,545 A | 5/1999 | Sabourin et al. | |
| 6,098,929 A | 8/2000 | Falbel | |
| 6,087,646 A | 11/2000 | Didinsky | |
| 6,147,644 A | 11/2000 | Castles et al. | |
| 6,268,944 B1 * | 7/2001 | Szapiel | H04B 10/118 398/129 |
| 6,297,897 B1 | 10/2001 | Czichy et al. | |
| 6,411,414 B1 * | 6/2002 | Abate | H04B 10/1121 398/182 |
| 6,445,496 B1 * | 9/2002 | Presby | H04B 10/1121 359/366 |
| 6,535,734 B1 | 3/2003 | Miller et al. | |
| 6,570,695 B1 * | 5/2003 | Pribil | H04B 10/1121 398/121 |
| 6,661,975 B1 * | 12/2003 | Hall | H04B 10/118 398/177 |
| 6,674,576 B1 | 1/2004 | Carollo et al. | |
| 6,778,779 B1 * | 8/2004 | Shay | H04B 10/2587 398/120 |
| 6,834,164 B1 * | 12/2004 | Chan | H04B 10/1127 398/129 |
| 6,868,237 B2 * | 3/2005 | Willebrand | H04B 10/1125 359/341.1 |
| 7,197,248 B1 | 3/2007 | Vorontsov et al. | |
| 7,289,736 B1 * | 10/2007 | Graves | G02B 26/06 398/119 |
| 7,292,789 B1 | 11/2007 | Capots et al. | |
| 7,373,673 B1 | 5/2008 | Krill et al. | |
| 7,343,099 B2 | 11/2008 | Wirth et al. | |
| 7,457,326 B2 * | 11/2008 | Rogers | G02B 6/04 372/32 |
| 7,609,972 B2 * | 10/2009 | Cunningham | H04B 10/1127 398/118 |
| 7,631,839 B1 | 12/2009 | Duncan et al. | |
| 7,826,752 B1 | 11/2010 | Zanoni et al. | |
| 7,920,794 B1 * | 4/2011 | Whaley | H04B 10/1125 398/122 |
| 7,925,167 B1 | 4/2011 | Kozubal et al. | |
| 8,526,328 B2 | 9/2013 | Hunt et al. | |
| 8,989,579 B2 | 3/2015 | Arnold et al. | |
| 9,048,950 B2 | 6/2015 | Chen et al. | |
| 9,304,259 B1 | 4/2016 | Yasumura | |
| 9,813,151 B2 * | 11/2017 | Kingsbury | H04B 10/118 |
| 9,866,324 B2 * | 1/2018 | Clemmensen | H04B 10/118 |
| 2002/0041575 A1 * | 4/2002 | Karabinis | H04B 7/18539 370/319 |
| 2002/0121574 A1 | 9/2002 | Davis | |
| 2002/0167702 A1 | 11/2002 | Badesha et al. | |
| 2002/0167708 A1 * | 11/2002 | Tsao | H04B 10/118 398/204 |
| 2003/0050008 A1 * | 3/2003 | Patterson | H04B 7/18578 455/12.1 |
| 2003/0091276 A1 * | 5/2003 | Wang | G02B 6/2931 385/31 |
| 2003/0095302 A1 | 5/2003 | Schuster et al. | |
| 2003/0172208 A1 | 9/2003 | Fidler | |
| 2004/0127158 A1 * | 7/2004 | Dai | H04B 7/18513 455/12.1 |
| 2004/0148083 A1 * | 7/2004 | Arakawa | G07C 5/008 701/50 |
| 2004/0172403 A1 * | 9/2004 | Steele | G07C 9/00 |
| 2004/0249964 A1 | 12/2004 | Mougel et al. | |
| 2005/0100339 A1 * | 5/2005 | Tegge, Jr. | H04B 10/118 398/125 |
| 2006/0024061 A1 * | 2/2006 | Wirth | H04B 10/1125 398/129 |
| 2006/0030258 A1 | 2/2006 | Mocquard et al. | |
| 2007/0031150 A1 * | 2/2007 | Fisher | H04B 10/1125 398/128 |
| 2007/0031151 A1 * | 2/2007 | Cunningham | H04B 10/1123 398/131 |
| 2008/0123738 A1 | 5/2008 | Katsavounidis et al. | |
| 2008/0181108 A1 | 7/2008 | Hashmi et al. | |
| 2009/0131046 A1 * | 5/2009 | Karabinis | H04B 7/18563 455/427 |
| 2010/0021166 A1 | 1/2010 | Way | |
| 2010/0090866 A1 | 4/2010 | Chen et al. | |
| 2010/0201566 A1 | 8/2010 | Wyler | |
| 2010/0226495 A1 | 9/2010 | Kelley et al. | |
| 2011/0004405 A1 | 1/2011 | Hutchin | |
| 2011/0169688 A1 * | 7/2011 | Wyler | H04B 7/195 342/354 |
| 2011/0239421 A1 | 10/2011 | Tertitsk | |
| 2011/0274429 A1 * | 11/2011 | Caplan | H04B 10/5561 398/65 |
| 2012/0008961 A1 * | 1/2012 | Chen | H04B 10/1121 398/119 |
| 2012/0109425 A1 | 5/2012 | Janson et al. | |
| 2012/0199697 A1 | 8/2012 | Nagabhushan et al. | |
| 2012/0276898 A1 | 11/2012 | Korb et al. | |
| 2012/0292531 A1 | 11/2012 | Grudinin et al. | |
| 2013/0156439 A1 * | 6/2013 | Arnold | 398/125 |
| 2013/0182620 A1 | 7/2013 | Chaffee et al. | |
| 2013/0183040 A1 | 7/2013 | Elahmadi | |
| 2013/0193303 A1 | 8/2013 | Smith et al. | |
| 2013/0208082 A1 | 8/2013 | Williams et al. | |
| 2013/0293414 A1 | 11/2013 | Robinson et al. | |
| 2014/0004853 A1 * | 1/2014 | Mitchell | H04B 7/18506 455/431 |
| 2014/0016932 A1 | 1/2014 | Coleman et al. | |
| 2014/0016941 A1 * | 1/2014 | Coleman | H04B 7/18521 398/121 |
| 2014/0222472 A1 | 8/2014 | Platzer | |
| 2014/0241731 A1 * | 8/2014 | Peach | H04B 10/1127 398/128 |
| 2014/0266420 A1 | 9/2014 | Brown | |

(56) References Cited

U.S. PATENT DOCUMENTS

| | | | |
|---|---|---|---|
| 2014/0270749 A1 | 9/2014 | Miniscalco et al. | |
| 2014/0294399 A1* | 10/2014 | Makowski | H04B 10/11 398/126 |
| 2014/0341586 A1* | 11/2014 | Wyler | H04B 10/118 398/115 |
| 2014/0354477 A1 | 12/2014 | Robinson | |
| 2014/0354996 A1 | 12/2014 | Fontecchio et al. | |
| 2014/0362875 A1* | 12/2014 | Le Kernec | H04B 10/112 370/535 |
| 2014/0376001 A1 | 12/2014 | Swanson | |
| 2015/0078250 A1* | 3/2015 | Mineta | H04J 13/10 370/320 |
| 2015/0110491 A1 | 4/2015 | Gayrard et al. | |
| 2015/0125157 A1* | 5/2015 | Chao | H04B 10/118 398/122 |
| 2015/0131703 A1* | 5/2015 | Balter | H04B 7/18513 375/133 |
| 2015/0207562 A1 | 7/2015 | Brumley, II et al. | |
| 2015/0215041 A1 | 7/2015 | Pechner et al. | |
| 2015/0298827 A1 | 10/2015 | Nguyen et al. | |
| 2016/0013882 A1* | 1/2016 | Hashimoto | H04B 10/118 398/65 |
| 2016/0033649 A1* | 2/2016 | Mathews | G01S 5/021 342/357.48 |
| 2016/0043800 A1* | 2/2016 | Kingsbury | H04B 10/118 398/125 |
| 2016/0087711 A1 | 3/2016 | Tayrac et al. | |
| 2016/0112124 A1 | 4/2016 | Juarez et al. | |
| 2016/0204851 A1 | 7/2016 | Li et al. | |
| 2016/0204899 A1 | 7/2016 | Kojima et al. | |
| 2016/0308601 A1* | 10/2016 | Mochida | H01Q 1/1257 |
| 2017/0264365 A1* | 9/2017 | Takahashi | H04B 10/118 |

OTHER PUBLICATIONS

International Search Report and Written Opinion dated Jul. 26, 2016 from International Application No. PCT/US16/12644.
International Search Report and Written Opinion dated Jul. 26, 2016 from International Application No. PCT/US16/12643.
International Search Report and Written Opinion dated Jun. 29, 2015 from International Application No. PCT/US2015/019890.
Kramer, "EDRS (European Data Relay Satellite) Constellation," EO Sharing Earth Observation Resources, Oct. 21, 2013, pp. 1-9.
Notice of Allowance dated Dec. 30, 2016 from U.S. Appl. No. 14/644,425.
Office Action dated Apr. 22, 2016 from U.S. Appl. No. 14/644,425.
Office Action dated Sep. 8, 2016 from U.S. Appl. No. 14/817,985.
Aerocube-OCSD A, B (IOCPS A, B), accessed at: http://space.skyrocket.de/doc_sdat/aerocube-ocsd.htm, 2 pages, Dec. 5, 2014.
Aherne, M. R. et al., "Aeneas-Colony I Meets Three-Axis Pointing", 25th Annual AIAA/USU Conference on Small Satellites, pp. 1-11, Aug. 8-11, 2011.
Alluru, S. R. et al., "An Optical Payload for Cubesats," 24$^{th}$ Annual AIAA/USU Conference on Small Satellites, pp. 1-13, Aug. 9, 2010.
Alluru, Seshupriya Reddy, "A System Design of an Optical Wireless Communication System for Cubesats," University of Florida Master's Thesis, 78 pages, Dec. 2010.
Andrews, L. C. et al. "Laser Beam Propagation through Random Media", Second Edition (SPIE Press Monograph vol. PM152). SPIE—The International Society for Optical Engineering, ISBN-13: 978-0819459480, 2005.
Bingham, B. et al., "The Road to a Three-Axis-Stabilized CubeSat," 32nd Annual AAS Rocky Mountain Guidance and Control Conference, vol. 133, pp. 607-613 Jan. 30 thru Feb. 4, 2009.
Biswas, A. et al., "The Atmospheric Channel", Deep Space Communications, Chapter 3, pp. 121-213, 2006.
Buchen, E. et al., "2014 Nano/Microsatellite Market Assessment," Spaceworks Enterprises, Inc., (SEI), Atlanta, GA, pp. 1-18, 2014.
Caplan, D. O., et al., "Demonstration of 2.5-Gslot/s optically-preamplified M-PPM with 4 photons/bit receiver sensitivity," Optical Fiber Conference (OFC), Paper PDP32, 3 pages, 2005.
Caplan, D.O., et al., "Laser communication transmitter and receiver design," J. Opt. Fiber Commun. Rep. 4, pp. 225-362, 2007.
Caplan, D.O., et al., "Power-efficient Noise-insensitive Optical Modulation for High-sensitivity Laser Communications," CLEO, 2 pages, Jun. 8-13, 2014.
Caplan, D. O. et al., "Parallel Direct Modulation Laser Transmitters for High-speed High-sensitivity Laser Communications," CLEO: Applications and Technology, PDPB12, Optical Society of America, 2 pages, 2011.
Caplan, D. O., "A technique for measuring and optimizing modulator extinction ratio," IEEE, Conference on Lasers and Electro-Optics, 2000 (CLEO 2000), pp. 335-336, May 7-12, 2000.
Chandrasekhar, S., et al., "Chirp-Managed Laser and MLSE-RX Enables Transmission Over 1200 km at 1550 nm in a DWDM Environment in NZDSF at 10 Gb/s Without Any Optical Dispersion Compensation" Photonics Tech. Letters, vol. 18, pp. 1560-1562, Jul. 2006.
Coffee, B. et al., "Propagation of CubeSats in LEO using NORAD Two Line Element Sets: Accuracy and Update Frequency", AIAA Guidance, Navigation, and Control Conference, pp. 1-15, Aug. 19-22, 2013.
Crassidis, J. L. et al., "A Survey of Nonlinear Attitude Estimation Methods", pp. 1-48, 2007.
"Cubesat Design Specification", Rev. 13, The CubeSat Program, Cal Poly SLO, pp. 1-42, Feb. 20, 2014.
Edwards, B. L., et al., "Overview of the Laser Communications Relay Demonstration Project," Space Ops Conference, pp. 1-11, Jun. 11-15, 2012.
Excelitas Technologies GmbH & Co. KG, "Thermopile Detector—TPD 1T 0214 G9/3850,"Sensor Solutions—Product Specification, Revision—Jan. 24, 2013, 4 pages.
Gangestad, J. W. et al., "Operations, orbit determination, and Formation Control of the Aerocube-4 Cubesats," (SSC13-X-4), Proc. of 27th AIAA/USU Conference on Small Satellites, pp. 1-8, Aug. 10, 2013.
Hanson, J., et al. "The EDSN Intersatellite Communications Architecture," Proc. of 28th AIAA/USU Conference on Small Satellites, p. 111, Aug. 4-7, 2014.
Hemmati, H., "Laser-Communications with Lunar CubeSat," Jet Propulsion Laboratory, California Institute of Technology, pp. 1-11, Apr. 11, 2013.
Hashmall, J.A., et al., "An Algorithm for Converting Static Earth Sensor Measurements Into Earth Observation Vectors", NASA Technical Memorandum from the proceedings of the Flight Mechanics Symposium, pp. 1-13, Oct. 2003.
Janson, S. et al., "The NASA Optical Communication and Sensor Demonstration Program: An Update." (SSC14-VI-1), Proc. of 28th Annual AIAA/USU Conference on Small Satellites, MIT: Nanosatellite Optical Downlink Experiment (NODE), The Aerospace Corporation 2014, pp. 1-10, Aug. 5, 2014.
Janson, S. et al., "Attitude Control on the Pico Satellite Colar Cell Testbed-2", Presentation of Proceedings of the 26$^{th}$ Annual AIAA/USU Conference on Small Satellites, pp. 1-13, Aug. 13, 2012.
Janson, S. et al., "The NASA Optical Communication and Sensor Demonstration Program" (SSC13-II-1), The Aerospace Corporation, pp. 1-19, Aug. 12, 2013.
Kingsbury, R.W. et al., "Design of a Free-Space Optical Communication Module for Small Satellites," (SSC14-IX-6), 28$^{th}$ AIAA/USU Small Satellite Conference, pp. 1-10, Apr. 12, 2014.
Kingsbury, R.W., et al., "Two-Stage Control for CubeSat Optical Communications," CalPoly CubeSat Developers Workshop, pp. 1-29, Apr. 24, 2014.
Kingsbury, R.W., et al., "Fast-Steering Solutions for CubeSat-Scale Optical Communication," Proc. of International Conference on Space Optics, pp. 1-6, Oct. 7-10, 2014.
Klofas, B. et al., "A Survey of CubeSat Communication Systems: 2009-2012", Proceedings of 2013 CalPoly CubeSat Developers' Workshop, pp. 1-41, Apr. 2013.
Kneller, E.W. et al., "Cadet: A High Data Rate Software Defined Radio for SmallSat Applications", (SSC12-X-4), 26th Annual AIAA/USU Conference on Small Satellites, pp. 1-10, 2012.
Ladee, NASA's Ladee Mission, taken from http://www.nasa.gov/mission_pages/ladee/main/index.html, 2 pages, Dec. 5, 2014.

(56) References Cited

OTHER PUBLICATIONS

Lambert, S. et al, "Laser Communications in Space", Optical Engineering, vol. 35, No. 5, pp. 1513-1515, May 1996.
Lee, C-H et al., "Transmission of Directly Modulated 2.5-Gb/s Signals Over 250-km of Nondispersion-Shifted Fiber by Using a Spectral Filtering Method," IEEE Photonics Technology Letters, IEEE vol. 8, No. 12, pp. 1725-1727, Dec. 1996.
Li, J. et al., "Design of Attitude Control Systems for CubeSat-Class Nanosatellite", Research Article Journal of Control Science and Engineering, vol. 13, pp. 1-9, Apr. 24, 2013.
Liebe C.C. et al., "Accuracy Performance of Star Trackers—A Tutorial" IEEE Transactions on Aerospace and Electronic Systems, vol. 38 No. 2, pp. 587-599, Apr. 2002.
Mahgerefteh, D. et al., "Penalty-free propagation over 600 km of nondispersion-shifted fiber at 2.5 Gb/s using a directly laser modulated transmitter", CLEO, 1 pages, 1999.
Maryland Aerospace Inc., MAI-400 Reference Manual, 2 pages, Apr. 29, 2014.
Merrelli, Aronne, "The Atmospheric Information Content of Earth's Far Infrared Spectrum", A Dissertation approved for the degree of Doctor of Philosophy (Atmospheric and Oceanic Sciences), 135 pages, Nov. 26, 2012.
National Aeronautics and Space Administration, "Laser Communications Relay Demonstration, The Next Step in Optical Communications", 2 pages, Jun. 26, 2013.
Nguyen, T. et al., "Development of a pointing, acquisition, and tracking system for a CubeSat optical communication module," in SPIE OPTO, vol. 9354, pp. 93540O-1 to 93540O-9, Mar. 26, 2015.
Oaida, B.V. et al., OPALS: An Optical Communications Technology Demonstration from the International Space Station, Aerospace Conference, IEEE, pp. 1-20, 2013, Mar. 2-9, 2013.
Oaida, B.V. et al. "Optical link design and validation testing of the Optical Payload for Lasercomm Science (OPALS) system", Free-Space Laser Communication Technologies XXVI, Proc. of SPIE, vol. 8971, pp. 89710U-1 to 89710U-15, Mar. 6, 2014.
Phenneger, M.C., et al., "Infrared Horizon Sensor Modeling for Attitude Determination and Control: Analysis and Mission Experience", NASA Technical Memorandum, vol. 86181, 239 pages, Mar. 1985 (Part 1 of 2).
Phenneger, M.C., et al., "Infrared Horizon Sensor Modeling for Attitude Determination and Control: Analysis and Mission Experience", NASA Technical Memorandum, vol. 86181, 239 pages, Mar. 1985 (Part 2 of 2).
Pong, C. et al., High-Precision Pointing and Attitude Determination and Control on ExoplanetSat, AIAA Guidance, Navigation, and Control Conference, pp. 1-24, Aug. 13-16, 2012.
Pong, C. et al., "A Dual-Spinning, Three-Axis-Stabilized CubeSat for Earth Observations," AIAA Guidance, Navigation, and Control (GNC) Conference, pp. 1-24, 2013.
Pong, C. et al., "High-Precision Pointing and Attitude Estimation and Control Algorithms for Hardware-Constrained Spacecraft", PhD Thesis, Massachusetts Institute of Technology, pp. 1-254, May 22, 2014.
Robinson, B.S. et al., "The Lunar Laser Communications Demonstration", International Conference on Space Optical Systems and Applications (ICSOS), pp. 54-57, IEEE, May 11-13, 2011.
Sarda, K. et al., "Canadian Advanced Nanospace Experiment 2 Orbit Operations: Two Years of Pushing the Nanosatellite Performance Envelope", ESA Small Satellites, Services and Systems Symposium, 20 pages, 2010.
Sebacher, K.S. et al., "Laser Crosslink Configurations for RF Satellite Communications Systems", Military Communications Conference, MILCOM 1985, IEEE, vol. 1, pp. 98-103.
Schwarzenberg-Czerny, A, "The BRITE Nano-Satellite Constellation Mission," Proc. of 38th COSPAR Scientific Assembly, pp. 1-17, Jul. 15-18, 2010.
Sniegowski, J.J. et al., "Development, test and evaluation of MEMS micro-mirrors for free-space optical communications," Free-Space Laser Communications IV, Proceedings of SPIE, vol. 5550, pp. 299-312, Dec. 3, 2014.
Staehle, R.L. et al., "Interplanetary CubeSats: Opening the Solar System to a Broad Community at Lower Cost", Journal of Small Satellites, pp. 1-10, Dec. 8, 2012.
Shirasaki, M. et al., "Fibre Transmission Properties of Optical Pulses Produced Through Direct Phase Modulation of DFB Laser Diode," Electron. Letters, vol. 24, pp. 486-488, Apr. 14, 1988.
Swartwout, Michael, "The First One Hundred CubeSats: A Statistical Look," Journal of Small Satellites, vol. 2, pp. 213-233, 2013.
Vodhanel, R. S. et al., "Performance of Directly Modulated DFB Lasers in 10-Gb/s ASK, FSK, and DPSK Lightwave Systems," J. Lightwave Technology, vol. 8, pp. 1379-1386, Sep. 1990.
Vodhanel, R.S. et al., "Ten-to-Twenty Gigabit-per-Second Modulation Performance of 1.5-mm Distributed Feedback Lasers for Frequency-Shift Keying Systems," J. Lightwave Technology, vol. 7, pp. 1454-1460, Oct. 1989.
Unhelkar, V.V. et al., "Satellite Attitude Estimation using Sun Sensors, Horizon Sensors and Gyros", A dissertation approved for the degree of Master of Technology and Bachelors of Technology in Aerospace Engineering, 133 pages, Jun. 25, 2012.
Unhelkar, V.V. et al., "Spacecraft Attitude Determination with Sun Sensors, Horizon Sensors and Gyros: Comparison of Steady-State Kalman Filter and Extended Kalman Filter", Proceedings of the Itzhack Y. Bar-Itzhack Memorial Symposium on Estimation, Navigation, and Spacecraft Control, 22 pages, Oct. 2012.
Contestabile, G. et al., "40 Gb/s WDM NRZ-DPSK All-Optical Clock Recovery and Data Demodulation based on a Periodic Bragg Filter," Optical Fiber Communication/National Fiber Optic Engineers Conference, 3 pages, Feb. 24-28, 2008.
Dillow, Clay, "Record-Breaking New Fiber Optic Cables Transmit 100 Terabits per Second," Popular Science, pp. 1-3, Apr. 29, 2011.
Epple, Bernhard, et al., "Discussion on Design Aspects for Free-Space Optical Communication Terminals," IEEE Communications Magazine, vol. 45, Issue 10, pp. 62-69. Oct. 8, 2007.
Fields, R. et al., "5.625 Gbps Bidirectional Laser Communications Measurements Between the NFIRE Satellite and an Optical Ground Station", International Conference on Space Optical Systems and Applications, May 11-13, 2011, pp. 44-53.
Hamid Hemmati, et al., Near-Earth Laser Communications (book), Print ISBN: 978-0-8247-5381-8, CRC Press Mar. 3, 2009.
Henniger, H. et al., "Free-space optical transmission improves land-mobile communications," SPIE Newsroom, Jan. 9, 2007, pp. 1-3.
Henniger, H. and Wilfert, O., "An Introduction to Free-space Optical Communications", Radioengineering Journal, vol. 19, No. 2, Jun. 2010, pp. 203-212.
Horwath, J., et al., "Broadband Backhaul Communication for Stratospheric Platforms: The Stratospheric Optical Payload Experiment (STROPEX)," Proc. SPIE 6304, Free-Space Laser Communications VI, 63041N, Sep. 1, 2006, 12 pages.
Kubo-oka, Toshihiro, et al., "Optical Communication Experiment Using Very Small TrAnsponder Component on a Small RISESAT", Proc. International Conference on Space Optical Systems and Applications (ICOS), Oct. 9-12, 2012, 6 pages.
Moores, John D. et al., "Architecture Overview and Data Summary of a 5.4 km Free-Space Laser Communications Experiment", Proc. of SPIE, vol. 7464, Aug. 2009, 9 pages.
Miniscalco, W.J., et al., "Optical Space-Time Division Multiple Access," Journal of Lightwave Technology, vol. 30, No. 11, pp. 1771-1785, Jun. 1, 2012.
Stotts, L. B. et al., "Hybrid Optical RF Airborne Communications," Proc. of IEEE, vol. 97, No. 6, pp. 1109-1127, Jun. 2009.
Stotts, L.B, et al, "Optical Communications in Atmospheric Turbulence," SPIE 2009, vol. 7464, Aug. 21, 2009, 17 pages.
Tyler, Glen A. et al., "Image-position error associated with a quadrant detector", Journal of Optical Society of America, vol. 72, No. 6, Jun. 1982, pp. 804-808.
Santanu, D. et al., "Requirements and Challenges for Tactical Free-Space Lasercomm", Military Communications Conference, IEEE MILCOM, Nov. 16-19, 2008, pp. 1-5.
Walther, F.G, et al, "Air-to-Ground Lasercom System Demonstration Design Overview and Results Summary," Proc. of SPIE, Aug. 24, 2010, vol. 7814, 9 pages.

(56) References Cited

OTHER PUBLICATIONS

Darrell, L., "The Internet—Brought to You by Drones and Balloons", Jun. 27, 2014, 2 pages, downloaded from http://www.bidnessetc.com/business/the-internet-brought-to-you-by-drones-and-balloons/ on Jan. 13, 2016.
Perry, T.S., "Start-up Profile: Skybox Imaging", May 1, 2013, 9 pages, downloaded from http://spectrum.ieee.org/at-work/innovation/startup-profile-skybox-imaging on Jan. 13, 2016.
http://www.digitalglobe.com, downloaded Jan. 13, 2016, 3 pages.
https://www.planet.com/, downloaded Jan. 7, 2013, 6 pages.
https://www.viasat.com/, downloaded Jan. 13, 2016, 3 pages.
http://intelsat.com, downloaded Jan. 13, 2016, 1 page.
www.laserlightcomms.com, downloaded Jan. 13, 2016, 2 pages.
International Search Report and Written Opinion from International Application No. PCT/US16/12641, dated May 11, 2016.
U.S. Appl. No. 15/054,546, filed Feb. 26, 2016, Boroson et al.
U.S. Appl. No. 14/991,394, filed Jan. 8, 2016, Boroson et al.
U.S. Appl. No. 14/991,377, filed Jan. 8, 2016, Boroson et al.
International Search Report and Written Opinion from International Application No. PCT/US2016/019732, 13 pages, dated Nov. 29, 2016.
U.S. Office Action dated Apr. 7, 2017, in regards to U.S. Appl. No. 14/991,394, 63 pages.
U.S. Office Action dated Feb. 22, 2017, in regards to U.S. Appl. No. 14/991,377, 58 pages.
U.S. Notice of Allowance dated Apr. 10, 2017, in regards to U.S. Appl. No. 14/644,425, 10 pages.
U.S. Notice of Allowance dated Apr. 12, 2017, in regards to U.S. Appl. No. 14/817,985, 11 pages.
U.S. Notice of Allowance dated Jan. 26, 2018 from U.S. Appl. No. 14/991,377, 22 pages.
U.S. Notice of Allowance dated Feb. 16, 2018 from U.S. Appl. No. 15/054,546, 5 pages.
U.S. Non-Final Office Action dated Jan. 9, 2018 from U.S. Appl. No. 15/805,094, 8 pages.

* cited by examiner

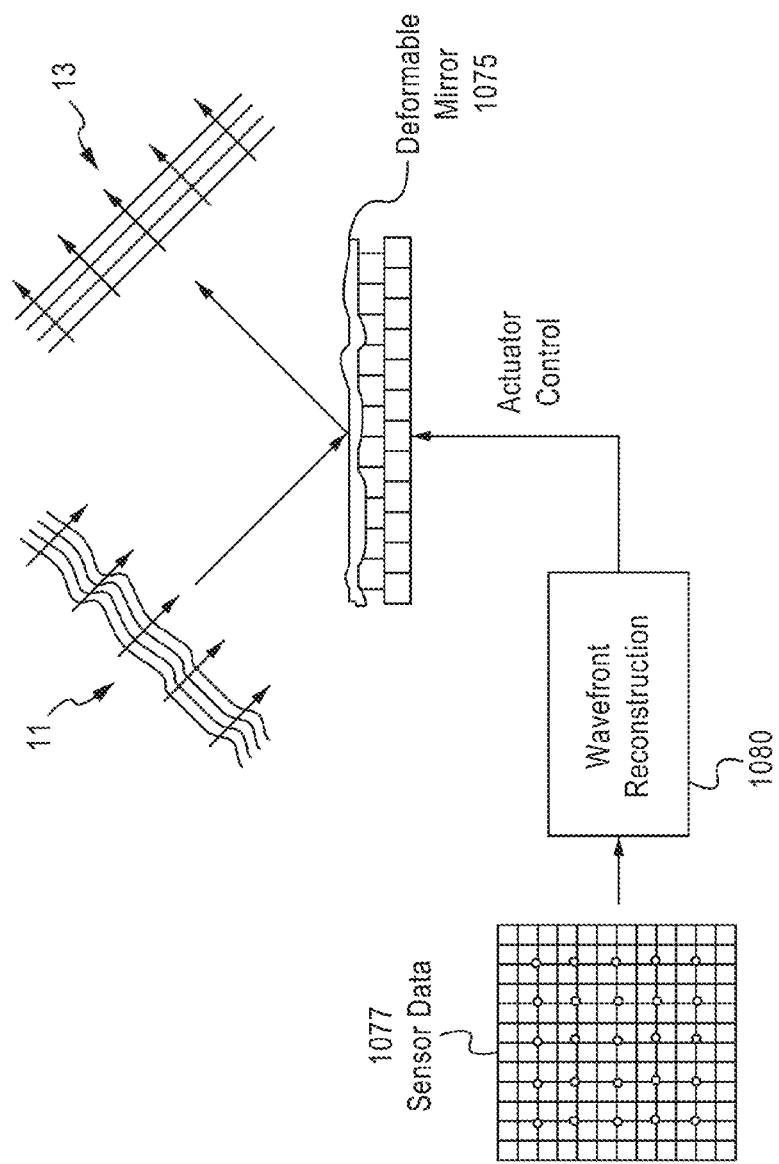

GROUND TERMINAL DESIGN FOR HIGH RATE DIRECT TO EARTH OPTICAL COMMUNICATIONS

CROSS-REFERENCE TO RELATED PATENT APPLICATION

This application claims priority, under 35 U.S.C. § 119(e), from U.S. Application No. 62/101,976, filed Jan. 9, 2015 and titled "Ground Terminal Design for High Rate Direct to Earth Optical Communications," U.S. Application No. 62/101,975, filed Jan. 9, 2015 and titled "Link Architecture and Spacecraft Terminal for High Rate Direct to Earth Optical Communications," and U.S. Application No. 62/101,955, filed Jan. 9, 2015 and titled "Network of Extremely High Burst Rate Optical Downlinks," and each of the foregoing applications is herein incorporated by reference in its entirety.

GOVERNMENT SUPPORT

This invention was made with government support under Contract No. FAS721-05-C-0002 awarded by the U.S. Air Force. The government has certain rights in the invention.

RELATED APPLICATIONS

This application is related to U.S. application Ser. No. 14/991,394, filed on Jan. 8, 2016, and titled "Network of Extremely High Burst Rate Optical Downlinks," and U.S. application Ser. No. 14/991,377, filed on Jan. 8, 2016, and titled "Link Architecture and Spacecraft Terminal for High Rate Direct to Earth Optical Communications," the contents of each of which is hereby incorporated by reference in its entirety.

BACKGROUND

Existing methods of delivering data from Earth-orbiting satellites to a ground stations fall into two general categories: sending radio transmissions to a fixed ground site via a relay satellite in, for example, geosynchronous Earth orbit (GEO) or sending radio transmissions directly to a ground site when the Earth-orbiting satellite passes over the ground site. Because of the long distances involved, and the paucity of GEO satellites, the geosynchronous relay approach is restricted in both availability and data rate. Likewise, because of the short connection time and restricted burst rates, the direct transmission is also restricted in its capability. In addition, Federal Communications Commission (FCC) and other regulations concerning radio-frequency (RE) spectrum allocation may constrain the available bandwidth and link availability for satellite transmissions. As a consequence, data transfer to ground networks from Earth-orbiting satellites presents a significant bottleneck in the data collection capabilities of present-day Earth-orbiting satellite systems. This bottleneck is getting worse now that satellite missions are generating more data than existing RE systems can handle.

SUMMARY

Embodiments of the present invention include an apparatus for receiving an optical signal transmitted from a spacecraft via a free-space optical communications channel. In some examples, the apparatus comprises at least one telescope, a single-mode waveguide in optical communication with the at least one telescope, an optical amplifier in optical communication with the single-mode waveguide and a receiver in optical communication with the optical amplifier. In operation, the telescope receives the optical signal, which is modulated at a rate of at least about 40 Gbps, from the spacecraft via the free-space optical communications channel. The single-mode waveguide guides the optical signal from the telescope to the optical amplifier, which amplifies the optical signal. And the receiver demodulates the optical signal at a rate of at least about 40 Gbps.

The telescope may define at least one aperture having a diameter of about 10 cm to about 100 cm. In some cases, the apparatus includes a plurality of apertures, each of which receives a corresponding portion of the optical signal.

Examples of the apparatus may receive wavelength-division multiplexed (WDM) optical signals from the spacecraft. In these examples, the receiver may comprise a wavelength-division demultiplexer in optical communication with the optical amplifier and a plurality of detectors in optical communication with the wavelength-division demultiplexer. In operation, wavelength-division demultiplexer separates the WDM optical signal into a plurality of optical signals, and the detectors demodulate the optical signals. The apparatus may also include a coherent source in optical communication with the receiver for coherently demodulating the optical signals.

The apparatus may also include an uplink transmitter to transmit identification and validation information to the spacecraft. In some instances, the uplink transmitter triggers transmission of the optical signal by the spacecraft when the spacecraft is at an elevation of at least about 20 degrees above the horizon. The apparatus may also include a controller, operably coupled to the plurality of receivers and the uplink transmitter, that senses at least one error associated with the optical signal. The uplink transmitter may trigger another transmission, by the spacecraft, of at least a portion of the optical signal in response to the error.

The apparatus may further comprise an adaptive optical element in optical communication with the at least one telescope and the single-mode fiber. In operation, the adaptive optical element modulates a spatial phase profile of the optical signal so as to compensate for atmospheric effects in the free-space optical communications channel.

Yet another embodiment of the present technology comprises a ground terminal for receiving a wavelength-division multiplexed (WDM) optical signal transmitted from a spacecraft. The ground terminal may comprise a plurality of telescopes in optical communication with the spacecraft, a plurality of optical amplifiers in optical communication with the plurality of telescopes, a coherent combiner in optical communication with the plurality of optical amplifiers, a wavelength-division demultiplexer in optical communication with the coherent combiner, and a plurality of receivers in optical communication with the wavelength-division demultiplexer. In operation, the telescopes receive corresponding portions of the WDM optical signal from the spacecraft, The optical amplifiers amplify the corresponding portions of the WDM optical signal, which are coherently combined by the coherent combiner into a coherently combined WDM optical signal. The wavelength-division demultiplexer separates the coherently combined WDM optical signal into a plurality of optical signals, which are demodulated by the receivers.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIG. 10D is a rendering of the wavefront sensor and the deformable mirror of FIG. 10A acting on an aberrated wavefront.

DETAILED DESCRIPTION

Figure 1A:
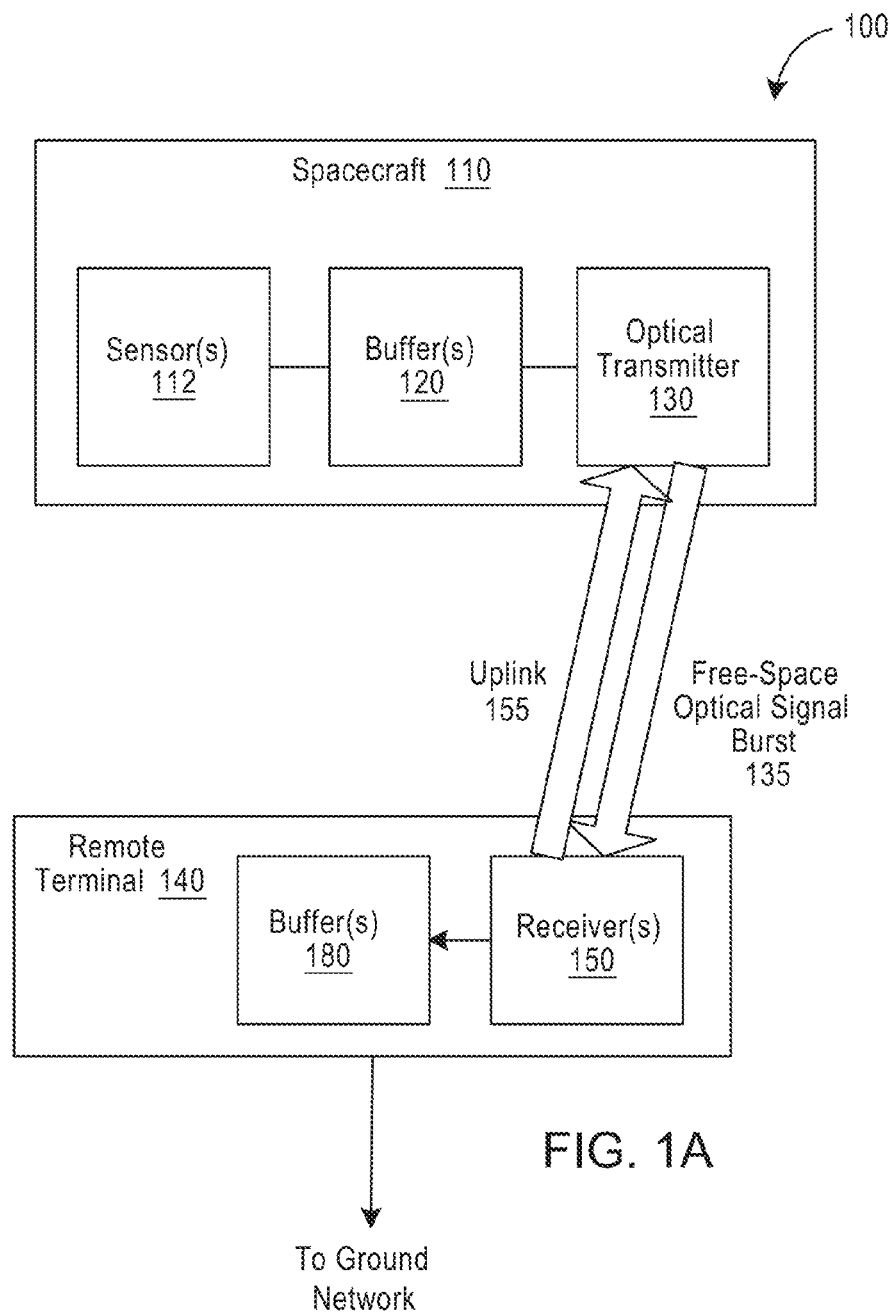
FIG. 1A is a block diagram of a free-space optical communications system that supports transmissions of bursts at data rates of 10 Gbps or more.

The direct downlink communications systems described herein leverage the extremely short wavelengths of optical telecom signals to achieve free space optical links that are only a few thousand kilometers long or less, and that deliver enough optical power (e.g., about 100 nW to a few µW) to support extremely high data rates with compact, low-cost satellite terminals and compact, low-cost remote terminals on the ground, in the air, or on other satellites. Such a system may include a satellite terminal that is small enough to be carried on a microsatellite (e.g., a 1U-6U cubesat) in low-Earth orbit (LEO) and have a mass of about 3 kilograms or less. Burst rates supported by these satellite terminals can be nearly any rate supportable in the fiber telecom market, for example, several hundreds of gigabits per second up to multiple terabits per second. Thus, these satellite terminals have direct downlink burst capabilities that can empty even very large storage buffers (e.g., 1 Tb, 10 Tb, 100 Tb, 1000 Tb, or more) in minutes. Furthermore, although traditional optical satellite communication systems are hindered by atmospheric obstacles such as clouds, which can block laser beams and/or cause excessive transmission delays, the extremely high burst rates of systems described herein can be used to transmit very large volumes of data under partly cloudy conditions, e.g., through the openings between clouds or other obscurations, such as leaves or dust.

Challenges of direct-to-Earth (DIE) laser communications (lasercom) can include short duration contact windows (e.g., less than ten minutes) during which a successful transmission can occur, long time gaps (e.g., tens of minutes to hours) between the transmission windows, limited on-board data storage, deleterious effects of atmospheric turbulence, especially at low elevation angles, and the inability to operate in cloudy weather. Direct-link optical communications systems described herein can have data rates that are high enough to empty the high-capacity on-board buffer(s) (e.g., having a capacity of at least about 1 Tb to hundreds of Tb) of a satellite in a single pass lasting only tens of seconds to a few minutes (e.g., 1-15 minutes).

In some embodiments, the median link latency does not exceed the buffer fill time for a given data acquisition rate. In other words, the buffer capacity and/or link latency may be selected so that the buffer is not be completely filled by sensor data between links. Overprovisioning the buffer capacity accounts for variations in the latency between links due to weather, etc.

In some embodiments, one or more distributed networks of compact optical ground terminals, connected via terrestrial data networks, receive data transmissions from a plurality of orbiting spacecraft (e.g., satellites). When a ground terminal site is obscured by clouds, an optical transmitter of the spacecraft sends buffered data to a next open/non-obscured ground terminal in the one or more distributed networks of compact optical ground terminals. Compact, low-cost space terminals described herein can be proliferated so as to increase the total number of interactions between the constellation of space terminals and the terrestrial data networks. Alternatively or in addition, inter-satellite crosslinks can be established within the communication system such that any single user (e.g., a satellite seeking to transmit data) can access an open terminal (e.g., a space terminal in orbit) at any time.

Direct-Link Optical Communications System

Turning now to the drawings, FIG. 1A is a block diagram of a direct-link optical communications system 100. The communications system 100 includes a spacecraft 110 (e.g., a satellite, such as a microsatellite, cubesat, etc.) in LEO or medium-Earth orbit (MEO) with one or more sensors 112 or other data-gathering devices that acquire data continuously, periodically, or aperiodically. One or more buffers 120 on the satellite store the data from the sensors for transmission by an optical transmitter 130 on the spacecraft 110 to a receiver 150 at a remote terminal 140 located on Earth. These transmissions may include one or more short bursts 135 (e.g., 10-second to 10-minute bursts) of data modulated at extremely high data rate (e.g., at least about 10 Gigabits per second (Gbps), at least about 40 Gbps, at least about 100 Gbps, at least about 200 Gbps, at least about 1 Terabit per second (Tbps), at least about 5 Tbps, or at least about 10 Tbps, depending on the application). The remote terminal 140, positioned at an altitude of less than about 100,000 feet (e.g., on the ground; on a building or structure; on a boat, buoy, or other ocean-based platform; or on an airplane, helicopter, unmanned aerial vehicle, balloon, or aircraft flying or hovering over the ground), receives the data at an average rate of at least about 10 Terabits (Tbits) per day, or at least about 100 Tbits per day. The remote terminal 140 includes one or more buffers 180 that store the data received from the optical transmitter 130 for transmission to one or more users via a communications network, such as the Internet.

These data transfer rates and volumes enable the satellite to generate and store data at a daily average rate of about 300 Mbps or at least about 1,200 Mbps, if not more. The remote terminal 140 stores the data in the one or more buffers 180 at an average rate of at least about 300 Mbps or at least about 1,200 Mbps and a burst rate of >10 Gbps. These average rates are computed over the span of a long enough period, such as an hour, several hours, a day, several days, or a week and could be higher depending on the modulation rates of the free-space optical communications signals, the number of ground stations and satellites, and the number of passes per day.

Figure 1B:
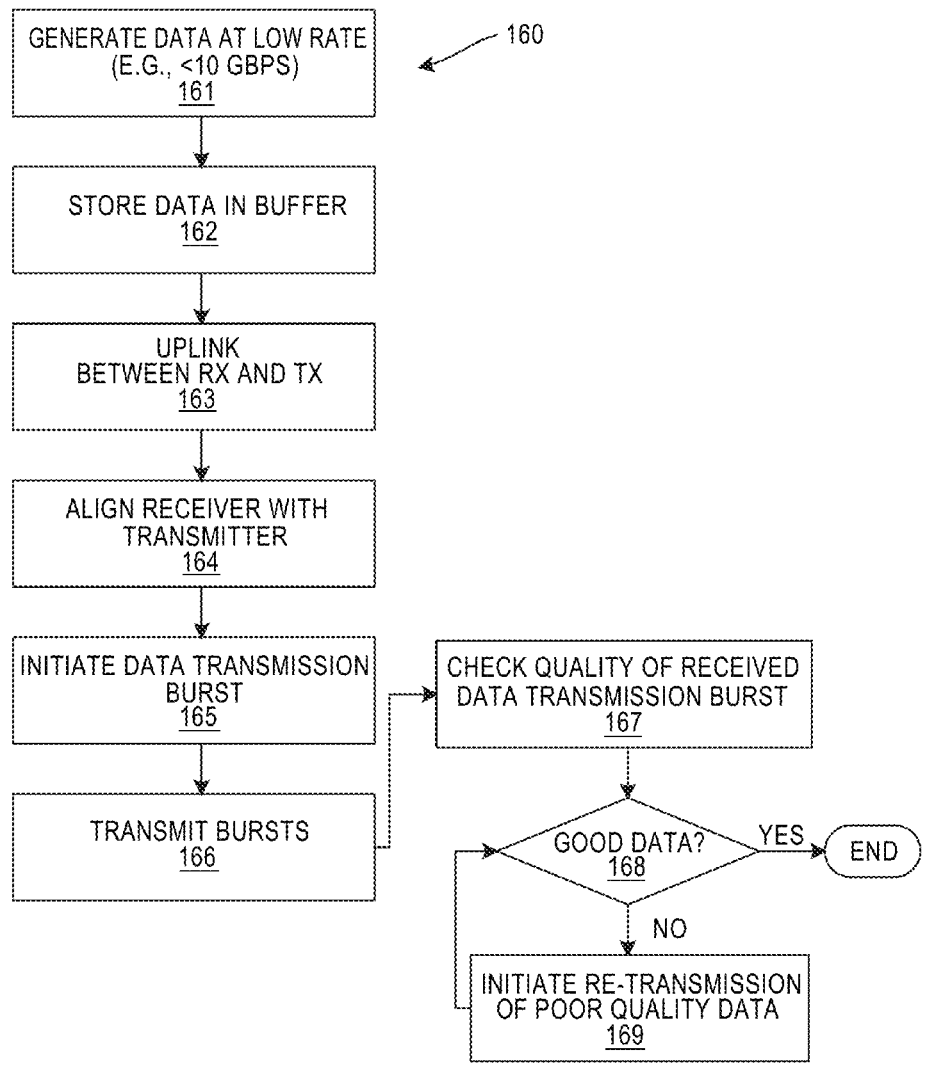
FIG. 1B is a flow diagram that illustrates free-space optical communications using the system shown in FIG. 1A.

FIG. 1B is a flow diagram that illustrates a free-space optical communications process 160 performed by the direct-link optical communications system 100 shown in FIG. 1A. During orbit and/or flight, the sensors 112 on the spacecraft 110 gather and/or create data and save the data in the onboard buffers 120 (box 161). For instance, the sensors 112 may include one or more imaging sensors, such as visible, infrared, or hyperspectral cameras, or any other suitable sensor, that generate Earth image data at a relatively low average rate (e.g., <10 Gbps, <1 Gbps, <100 Mbps, <10 Mbps, etc.). The sensors 112 may also include RF sensors like wide-band radars, synthetic aperture radars, etc. that sense objects or terrain on Earth. The sensors 112 may also generate scientific and/or telemetry data, including data about the spacecraft 110's flight path and electromagnetic events detected by the sensors 112.

The buffers 120 store the data for burst transmission by the optical transmitter 130 (box 162). In some cases, the data is encoded at a relatively low data rate (e.g., <10 Gbps, <1 Gbps, <100 Mbps, <10 Mbps, etc.) with a forward error correction (EEC) code before being stored in the buffers 120. In other cases, the data is encoded with a FEC at a high data rate upon being retrieved from the buffers 120 for transmission by the optical receiver 130.

FEC-encoded data comprises one or more code words. When data is transmitted through an atmospheric channel that has power fluctuations that last longer than the transmission time for multiple code words (e.g., for a code word transmission duration on the order of microseconds in duration and a power fluctuation that lasts milliseconds), an interleaver can be used to temporally interleave the symbols of many code words over a duration of about 1 second. With this approach, each code word sees a fairly uniform distribution of power fluctuations (as opposed to entire code words being erased as might occur without the interleaver) and approximately error free performance can be achieved without large power margins to overcome the effects of the power fluctuations.

In some cases, however, it may not be possible or practical to utilize the FEC techniques described above in the lowest-layer codes. For example, a commercial transceiver may employ proprietary codes designed for a fiber transmission, which does not typically experience the power fluctuations seen in the free space channel. Or the additional latency and/or memory that would be used for a ~1-second for greater) interleaver may be a problem. In such cases, errors that are not corrected by the lower-layer codes are compensated for at higher layers, for example, via erasure-correcting FEC codes (a form of FEC designed to specifically correct for erasures) and/or repeat-request protocols that request retransmission, via the uplink/beacon, of lost frames/segments.

In some cases, however, it may not be possible to utilize the FEC techniques described above in the lowest-layer codes. For example, a commercial transceiver may employ proprietary codes designed for a fiber transmission, which does not typically experience the power fluctuations seen in the free space channel. The receiver 150 initiates each transmission based on the spacecraft's trajectory, on-board data storage capacity, previous transmissions from the spacecraft 110, and projected timing of future transmission windows (passes) from the spacecraft 110. Based on this information, the receiver 150 communicates with the spacecraft 110 via a low-bandwidth (e.g., 10 kbps) RF or optical uplink 155 (box 163). The receiver 150 and the optical transmitter 130 align themselves with respect to each other, possibly using gimbals at the remote terminal 140 and the spacecraft 110 and/or body pointing by the spacecraft 110 (box 164). Alignment (or re-alignment) may occur continuously or as desired throughout the transmission process 160. Likewise, the spacecraft 110 and remote terminal 150 may communicate with each other via the uplink throughout the transmission process 160.

Once the receiver 150 and the optical transmitter 130 are properly aligned, the receiver 150 sends a control signal to the optical receiver 130 via the uplink 155 to initiate data transmission by the satellite 110 (box 165). In some cases, the receiver 150 detects or calculates when the spacecraft 110 reaches a predetermined angle above the horizon (for example, an angle below which operations are inefficient or below which the data volume that can be transferred during the pass is less than desired) as described below with respect to FIGS. 11A-11C and starts the transmission accordingly. The receiver 150 may also time the transmission(s) to avoid clouds, atmospheric turbulence, etc. in other cases, the optical transmitter 130 may initiate transmission at a predetermined time (i.e., without an explicit signal from the ground terminal).

In response to receiving the control signal, the optical transmitter 130 transfers, at as high a rate as is possible for the particular space terminal/remote terminal pair and link conditions, as much of the data as possible in one or more free-space optical signal bursts 135 (box 166). A burst 135 may comprise at least about 1 Terabyte of information, be modulated at a rate of Gbps (e.g., 40 Gbps, 100 Gbps, 1 Tbps, 10 Tbps, etc.), and/or last up to several minutes. As explained in greater detail below, the free-space optical signal burst 135 can include a plurality of wavelength-division multiplexed (WDM) signals. In operation, the receiver 150 de-multiplexes the WDM signals in the free-space optical signal burst 135.

The short link delay of the downlink allows for several options for data flow and control, such as interleaving/forward error correction (FEC), simple repeats or erasure-correcting ITC, automatic repeat requests (ARQs), and/or delay/disruption tolerant networking (DTN). To control data flow, the receiver 150 checks the quality of the bursts 135 that it receives from the satellite, possibly using an FEC code (box 167), cyclic redundancy check (CRC), or other methods. Clouds, atmospheric fading, temperature gradients, misalignment, and other phenomena may degrade the signal quality, e.g., by attenuating or distorting a given burst 135. Severe enough attenuation or distortion may introduce bit errors at a frequency above the frequency at which the FEC can correct errors.

Several mechanisms exist for detecting bit errors in transmitted, FEC-encoded data. At lower layers of the protocol stack (e.g., the physical layer and/or the data link layer), errors in the received data may be detected and/or corrected by an FEC decoder. A cyclic redundancy check (CRC) code may also be appended to the data to facilitate detection of errors that the FEC code does not detect. In some implementations, frames/segments of data with uncorrectable errors are not delivered to higher layers, and instead are "erased." The higher layers may detect such omissions and use additional protocols for correction, such as erasure-correcting FEC codes and/or repeat-request protocols that request retransmission, via the uplink/beacon, of lost frames/segments. Erased frames/segments can be detected using a sequence counter that counts frames/segments and that increments with each transmitted frame/segment.

If the receiver 150 (or a processor coupled to the receiver 150) detects errors based on the received FEC (box 168), it may re-align itself with respect to the optical transmitter 130, boost its receiver gain (e.g., by increasing local oscillator power for coherent detection), and/or send a control signal to the satellite 110 via the uplink 155. The check for good data may occur on the time scale of a frame of data (e.g., microseconds), and individual frames of data may be retransmitted if errors are caused by, say, turbulence fluctuations.

The satellite 110 may respond to this control signal by re-transmitting some or all of the degraded data (box 169) to the receiver 150. Before re-transmitting the degraded data, the optical receiver 130 may re-align itself with respect to the receiver 150 and/or boost its signal power in order to increase the signal-to-noise ratio (SNR) at the receiver 150. It may also reduce the data transmission rate in response to the control signal.

In some embodiments (e.g., those with strong FEC), the check for good data may occur on a time scale of a link session. If a link session is determined to be had (e.g., due to poor atmospheric conditions), the entire session may be repeated at the next link. Put differently, if the processor at the receiver 150 or remote terminal 140 determines that the received data is corrupt or degraded after the satellite 110 has passed from view, it may signal, to another remote terminal via the ground network, that the satellite should repeat the entire transmission during the link to the other remote terminal.

Data transmission proceeds when the optical receiver 150 has successfully received the last frames (or other structure) of data from the optical transmitter 130. The optical receiver 150 may send an acknowledgment signal to the optical transmitter 130 in response to receiving all of the data successfully. And if the optical transmitter 130 determines that it will not be able to retransmit some or all of the degraded data while the satellite 110 remains in view of the remote terminal 140, it may instead continue to store the data in the buffer 120 for transmission at the next opportunity.

Even when the link connection duration is short, the extremely high burst rate facilitates the download of huge amounts of stored data. Furthermore, although clouds are often considered to be the Achilles heel of laser communication, the spacecraft 110, when orbiting in LEO, can traverse the sky in a few tens of minutes, and under partly cloudy conditions can quickly link up with the remote terminal 140 via spaces between the clouds, and burst at extremely high data rates very large amounts of stored data. For example, under clear (cloud-free) conditions and at a transmission data rate of 200 Gbps, a 10-minute pass of the spacecraft 110 can be sufficient for downloading up to 15 Terabytes of data, depending upon the size of the buffer(s) 120. By extension, the communications system 100 can accomplish the transfer of up to 1.5 Terabytes of data in a sky with only 10% clearings between the clouds.

The remote terminal 140 can store the received data from one or more passes of the spacecraft 110 (e.g., via the data bursts received during each of the one or more passes), and can forward it to a user either immediately or upon request. For example, a user may request a particular set of data, and the system 100 may retrieve it from the corresponding satellite via the next available remote terminal. The remote terminal then forwards the received data to the user via a terrestrial data network, such as the Internet. In applications where the terrestrial data network is not widely distributed, this system could be used to distribute content to local caches around the globe. These caches may be connected to the Internet and/or to local users via local-area networks (e.g. WiFi, Cellular, etc.).

Satellite-Based Free-Space Optical Communications Networks

Because the satellite is in LEO or MEO, and the link is relatively short, the optical transmitter 130 and the receiver 150 can be relatively small, light, and inexpensive. And because the receiver 150 can also be small, light, and/or inexpensive, the system 100 may include many receivers 150 distributed over a wide area (e.g., the continental United States) to increase the probability that the spacecraft 110 will be in view of one receiver 150 before the spacecraft's buffer fills up and either stops recording data or starts overwriting data. The receivers 150 may be located at fixed sites, mobile sites, aircraft, and/or even other spacecraft equipped with optical transmitters 130 for relaying data to Earth. In other words, communications systems 100 may include a network of space-based optical transmitters 130 and ground-based, airborne, and/or space-based optical receivers that can to establish space-to-ground (LEO-to-ground), space-to-air, or space-to-space (e.g., LEO-to-LEO or LEO-to-GEO) communications links.

The set-up and breakdown of these links can be coordinated with low-bandwidth optical and/or RF uplinks according to a predetermined data delivery protocol. In some instances, coordination and control of the space system (e.g., including the spacecraft 110 and, optionally, one or more further spacecraft) is performed using optical uplinks from one or more remote terminals, and/or via RF communications with the spacecraft 110 and the optical transmitter 130. For instance, control information (e.g., scheduling information, updated terminal location, software updates, etc.) may be delivered to the spacecraft 110 whenever the spacecraft 110 is in contact with a remote terminal 140, an RF terminal on the ground, or a space relay. Coordination and control of the ground system (e.g., including the one or more ground terminals 140 and, optionally, a network interconnecting the ground terminals 140) can be performed using ground connections and/or optically from the space network (e.g., for geographically isolated remote terminals 140). In other embodiments, the optical uplink is omitted.

Figure 1C:
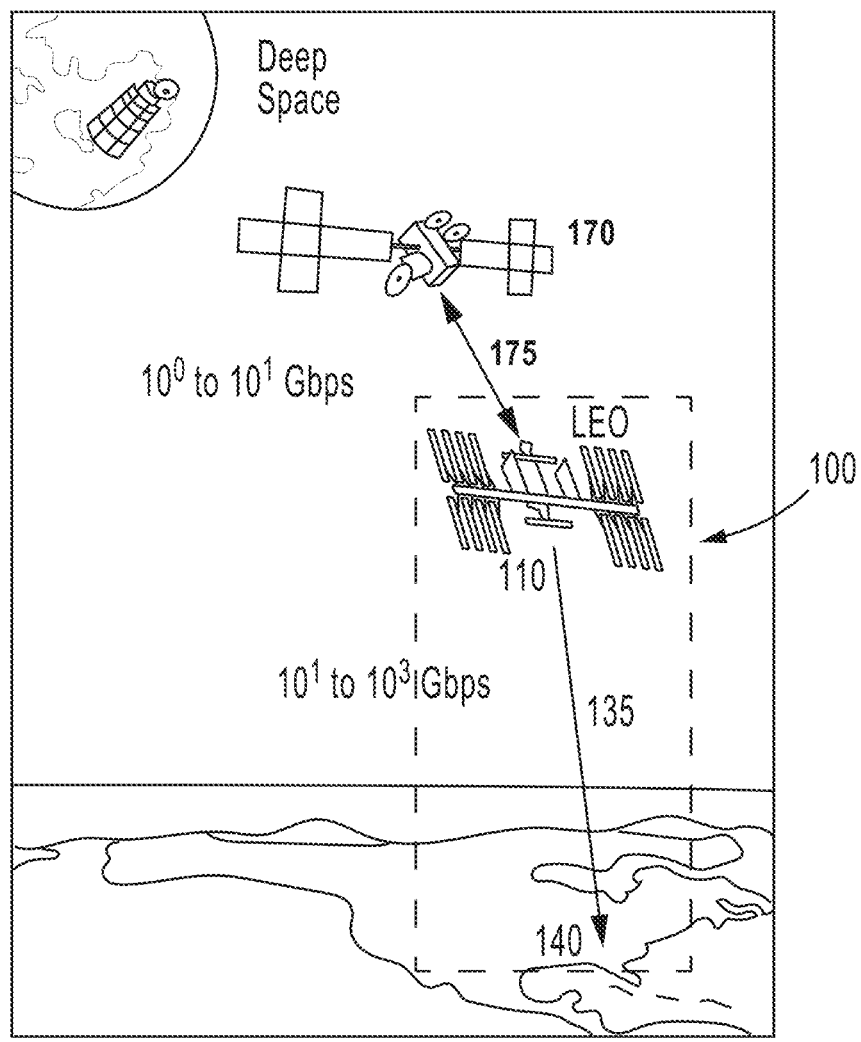
FIG. 1C is a rendering of an implementation of the communications system of FIG. 1A as part of a space-to-ground communication network.
Figure 1D:
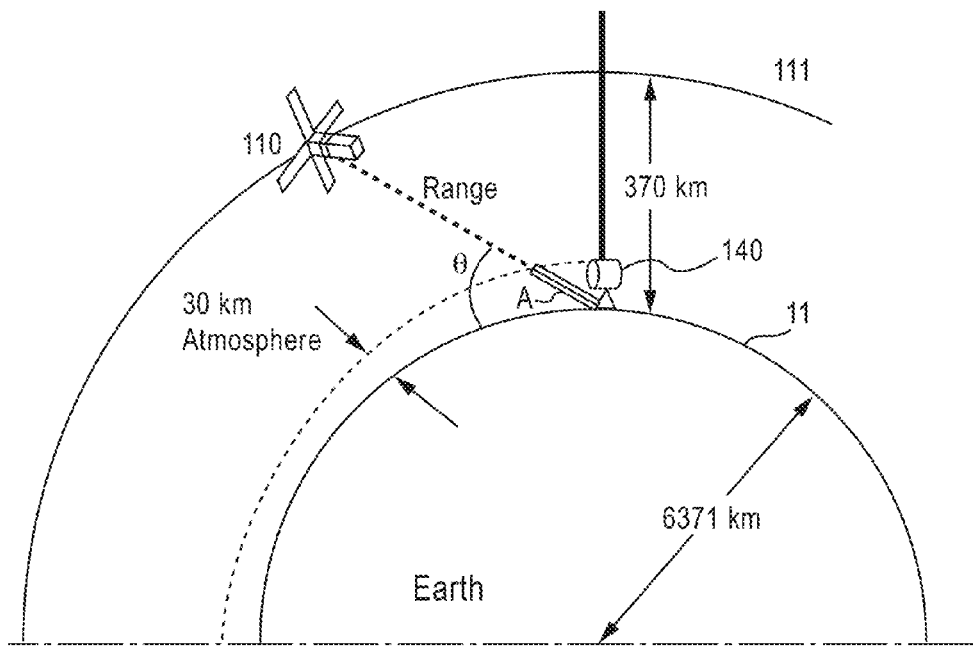
FIG. 1D illustrates how the elevation angle changes as the spacecraft passes over a remote terminal on Earth.

FIG. 1C shows how the communications system 100 of FIG. 1A can be used to relay data from another satellite 170. The other satellite 170 and the LEO satellite 110 exchange data via relatively low-bandwidth (e.g., 1-40 Gbps) one-way or two-way communications link 175, possibly over minutes or hours. The LEO satellite 110 stores the data from the other satellite 170 in its on-board buffers 120, When the LEO satellite 110 is in view of a remote terminal 140 on Earth, it transmits the data to the remote terminal in a free-space optical signal burst 135 as described above and below.

System Components

Figure 2A:
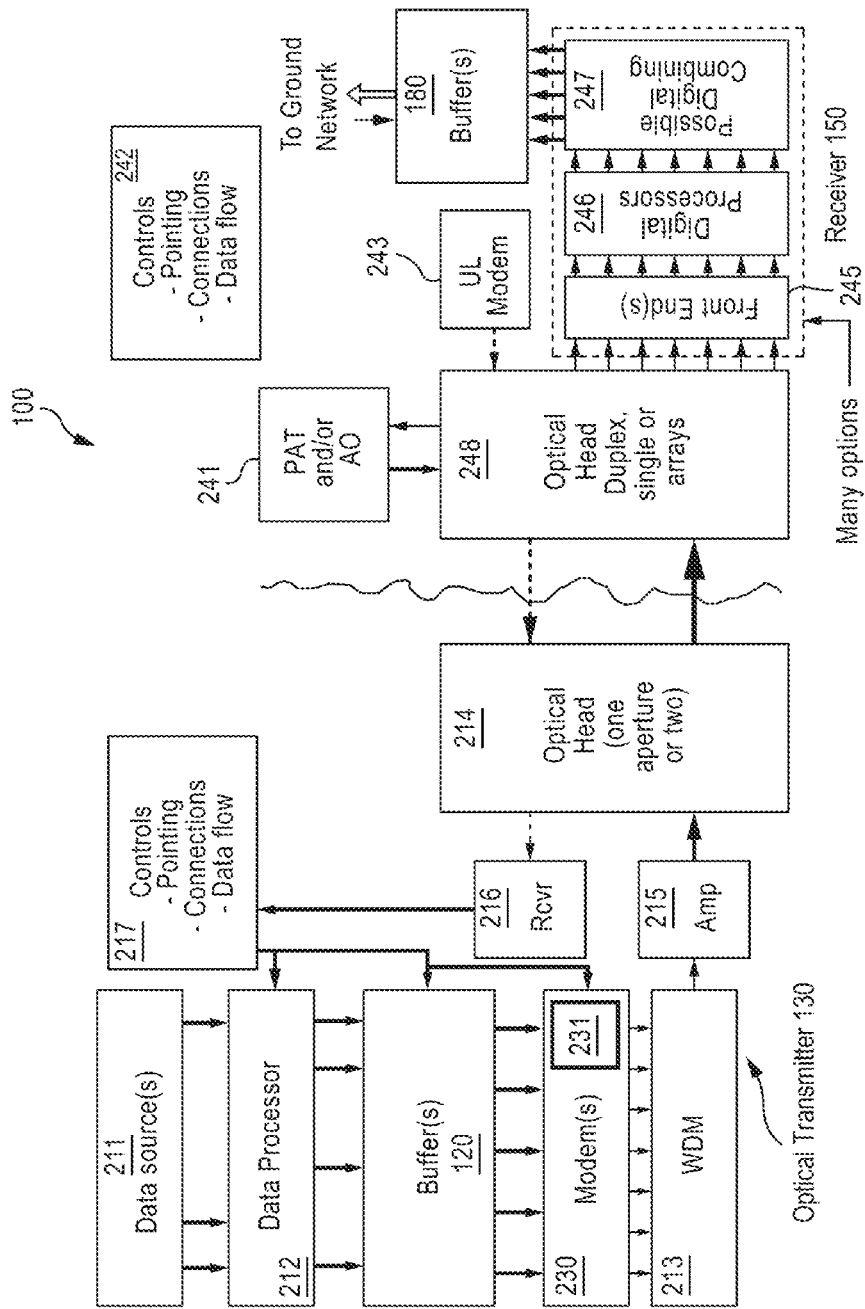
FIG. 2A is a block diagram showing components of space and ground segments of a direct downlink communications system.

FIG. 2A is a block diagram showing components of the high-data-rate downlink optical transmitter 130 and the optical receiver 150 of the direct downlink communications system 100. The direct downlink communications system 100 may connected to a ground network at the receiver 150 (e.g., via a buffer 180 on the receiver side).

An Example Optical Transmitter

The optical transmitter 130 can include one or more high-capacity buffers 120 and one or more modems 230. The high-capacity buffers 120 are configured to buffer data received at a first rate from one or more local data sources 211, including the sensors 112 shown in FIG. 1A, and are electrically coupled to the modems 230 to transfer the data to the modems 230 at a second rate that is higher than the first rate. The data may be pre-processed via a data processor 212 prior to receipt at the buffer(s) 120, for example, to insert error correction, request resending of erroneous bits, and/or to exert feed forward control by detecting and accounting for data errors. The data in the data sources 211 can include scientific, metrology, position, and/or other types of data, that is collected during a spacecraft mission and stored between readout sessions.

The modem(s) 230 can include power conditioning electronics (a power conditioning "subsystem"), a digital data formatter and encoder, and a high-speed modulator configured to perform high-speed amplitude and/or phase modulation (e.g., quadrature phase shift keying (QPSK), quadrature amplitude modulation (QAM), etc.), and one or more master laser transmitters 231 that emit light in the telecom C band (1530-1565 nm), for example, at 1550 nm. The outputs of the master laser transmitters 231 may be spaced in the spectral domain at integer multiples of about 50 GHz within this band. The modem(s) 230 receives buffered data from the buffer(s) 120, either via a serial channel or via parallel channels, and converts the buffered data into a plurality of modulated optical signals. In some implementations, the output speed of the buffer(s) 120 is matched to the modulator.

To achieve the highest possible data rates, the space terminal can further include a fiber or Arrayed-Waveguide-Grating (AWG) wavelength division multiplexer (WDM) 213 that is fed by multiple master laser transmitters 231 of the modem(s) 230, operating at different wavelengths. Other devices suitable for multiplexing the signals from the master laser transmitters 231 include, but are not limited to fused-taper fiber couplers, free-space dichroics, and other devices known in the art of fiber-optic communications. Optical signals received at the WDM 213 from the laser transmitters 231 are multiplexed by the WDM 213 into a single, multiplexed optical signal. The WDM 213 is optically coupled (e.g., via an optical fiber, such as a single-mode optical fiber) to an optical amplifier 215 (e.g., a semiconductor optical amplifier or fiber amplifier, such as a C-band fiber amplifier) that amplifies the multiplexed optical signal (e.g., to a level of at least about 100 mW to several watts, or at least about 500 mW to several watts) before it passes through an optical head 214. In some embodiments, the laser transmitter 231 is housed separately from the modem(s) 230 within the optical transmitter 130 of the communications system 100.

The optical head 214 can comprise an optics assembly and, optionally, a gimbal (e.g., a two-axis gimbal). The optics assembly of the optical head 214 can include one or more telescopes, including a downlink telescope and an uplink telescope, each having an aperture with a diameter of between about 1 cm and about 5 cm. (In some cases, the downlink and uplink may share an aperture, e.g., if a gimbal is used to point the aperture.) The telescope can be fiber-coupled to the downlink optical transmitter 130 via a fiber-optic connection to the output of amplifier 215 and configured to transmit a downlink beam/signal 235 toward an optical receiver 150. Some optical terminals described herein are configured to support lasercom link data rates of several hundred Gbps or higher, with a total mass of less than about 5 kg and a total power consumption of about 50 W or less. Depending upon the embodiment, the data rate can be about 10 Gbps or more, about 40 Gbps or more, 100 Gbps, 200 Gbps, 1 Tbps, 5 Tbps, or up to 10 Tbps.

The optical head 214 is also operably coupled to a relatively low data rate uplink receiver 216 (or "receiving detector") having a wide acquisition field-of-view (e.g., 1 milliradian to about 50 milliradians) and configured to receive an uplink beacon from an optical receiver (e.g., of a remote terminal). The uplink receiver 216 may be operably coupled to the downlink telescope of the optical head 214, or to a further telescope within the optical head that is dedicated to the receiver 216 and is co-aligned with the downlink telescope. The uplink receiver 216 has a field of view that is large enough to detect an uplink signal from the receiver 150 when the spacecraft 100 (and, optionally, a dedicated gimbal of the spacecraft) has pointed the optics of the optical transmitter 130 toward the uplink source. (Note that there could also be a separate uplink data receiver, in addition to the acquisition receiver.)

When the uplink receiver 216 detects the uplink, it waits for a modulation (e.g., pulsed) which carries a unique identifier for the ground station. In some embodiments, the uplink signal carries an encrypted message containing an identifier of the optical receiver 150, If the optical transmitter 130 determines (e.g., based on contents of the uplink signal) that the detected uplink is an expected one, the optical transmitter 130's pointing can be fine-tuned so that the optical head 214 is pointed toward the optical receiver 150, at which time the optical transmitter 130 sends the downlink beam/signal. The uplink receiver 216 continues to monitor the uplink signal for pointing corrections and/or for link and data-flow control messages. Such messages could support, for instance, control of the optical transmitter 130 pointing via motions of the downlink beam that the optical receiver 150 detects as power variations.

There are a couple of specific cases of closed-loop point-ahead correction that could be considered. In one case, the spacecraft varies its pointing in a predetermined way and the receiver sends back information to correct a pointing bias based on its observations of the resulting power fluctuations. In another case, the receiver may command the spacecraft to adjust its pointing slightly in a particular direction. Then, based on its measurement of the impact of that motion on the measured received power, the receiver could command further adjustments.

The optical receiver 216 is operably coupled to a controller 217 ("control module" or "control electronics," for example, including one or more microprocessors). The optical receiver 216 sends uplink data received from the optical receiver 150 via the optical head 214 to the controller 217. The controller 217 is configured to control spacecraft and/or telescope pointing, connections to telemetry, and/or downlink data flow, and can be configured to monitor the "health" of optical components of the optical transmitter 130, the modem(s) 230, etc. For example, the modems 230, etc., may provide low-rate interfaces for monitoring their temperature, indications of faults in the receipt or transmission of data, etc.

The controller 217 can have command and/or telemetry connections with a spacecraft bus. The controller 217 can include a memory that stores positions of existing terminals (e.g., other space terminals and/or remote/ground terminals), its own position and attitude (e.g., over time), and/or a clock for synchronizing operations with the ground segment 240. The controller 217 can control the acquisition and uplink communication detector (i.e., optical receiver 216) and demodulate, validate, interpret, and/or act upon the uplinks. The controller 217 may also oversee the starting and stopping of the downlink data flow based on clocks, terminal angles, and/or requests from the optical receiver 150.

Steering of the optical transmitter 130 is performed by the two-axis gimbal optionally included within the optical head 214, and/or through body steering of the spacecraft itself, for example, if the spacecraft is a microsatellite, or with a small, fast-steering mirror. The spacecraft and/or the optical transmitter 130 can include one or more attitude sensors configured to measure the attitude of the optical transmitter 130.

In some embodiments, the optical transmitter is configured to optically crosslink high-speed data to other spacecraft (e.g., to other satellites within a constellation of satellites). Such optical transmitters can include any or all of the components described above with regard to the optical transmitter 130 of FIG. 2A, but may include larger telescopes and/or larger power amplifiers. Additionally, such optical transmitters may send buffered data over crosslinks at a lower data rate than on a downlink because of larger diffraction losses and smaller receive telescopes on the spacecraft with which the crosslink is established. However, cross-linkable optical transmitters may not require as full a set of data-handling protocols because of the all-vacuum nature of cross-links (e.g., there is no atmospheric fading due to turbulence or clouds).

In some embodiments, the optical transmitter 130 of the communications system 200 includes the optical head 214, the uplink acquisition and low-data-rate optical receiver 216, a high-data-rate optical transmitter with fast readout, and a control and spacecraft-interface function 217.

In some embodiments, the optical transmitter 130 includes one or more opto-mechanical components, such as an opto-mechanical scanner. Since a LEO link can be established at a very high data rate with a relatively small spacecraft aperture (e.g., a few centimeters or less), the opto-mechanical systems for the space terminal can be much simpler than those developed for larger apertures (>10 cm). While one could simply scale a more complex design to a smaller aperture, doing so would be unnecessarily expensive.

The performance of the optical link between the optical transmitter 130 and the optical receiver 150 ("link performance") can vary due to: (1) range variations as the spacecraft passes over the optical receiver 150; and/or (2) fading at the optical receiver 150 due to atmospheric turbulence, space terminal motion, clouds, etc., resulting in power fluctuations at the optical receiver 150. The optical receiver 150 can detect these power changes, for example by monitoring power and/or error performance, and can send corrections or repeat-requests to the optical transmitter 130 via, the uplink using relatively low-rate signaling.

An Example Receiver

Figure 9:
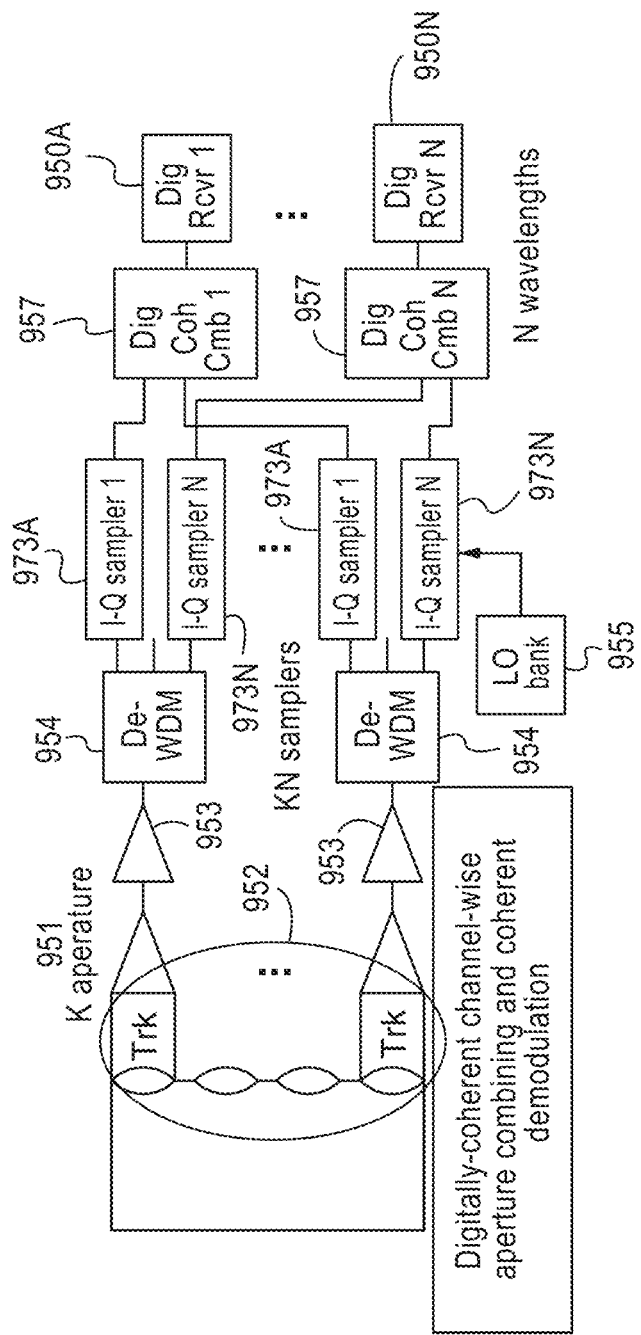
FIG. 9 is a schematic drawing of a receiver that includes several apertures and that is configured to perform digitally coherent channel-wise aperture combining and coherent demodulation.

As shown in FIG. 2A, the receiver 150 can include an optical head 248 communicatively coupled to a pointing, acquisition and tracking (PAT) module and/or an adaptive optics (AO) module 241 running one or more AO algorithms. The optical head 248 includes a compact telescope (or multiple telescopes, for example in an array) with a downlink aperture diameter of about 10 cm to about 100 cm (e.g., 20 cm, 30 cm, 40 cm, 50 cm, 60 cm, etc.) and a demultiplexer. (larger telescope diameters, e.g., for even higher-capacity links, are also contemplated.) The telescope can be mounted on a two-axis gimbal for pointing anywhere in the sky and for deployment almost anywhere on Earth. The compact design of the gimbal-mounted telescope allows for the telescope to be stationed on rooftops, car roofs, etc. In some embodiments, the telescope is mobile. Downlink signals received by the telescope of the optical head 248 are demultiplexed into a plurality of optical signals that are passed to an optical receiver 250, including one or more front ends 245 to convert the optical signals into digital signals for further processing at one or more digital processors 246 and, optionally, digital combining at 247 as shown in FIG. 9. The processed digital signals are then passed to one or more buffers 180 for storage and/or for communication to a user via a ground network.

The optical head 248 is optically coupled to an uplink (UL) modem 243 which transmits uplink signals to be sent to one or more space terminals 210. Low-power (e.g., about 0.1 W to about several Watts) uplink transmissions can be sent from the optical receiver 150 via a downlink aperture of the telescope of the optical head 248 (i.e., a "shared" aperture), or via a small, dedicated, uplink-only telescope/aperture. The uplink optical power and aperture may be selected such that it is below levels of concern for local eye safety and/or the Federal Aviation Administration (FAA). The optical receiver 150 may be configured to send an uplink transmission toward a selected/predetermined optical transmitter 130 at a selected/predetermined time so as to alert the optical transmitter 130 that a link is desired.

The uplink transmission beam may be sufficiently wide to remove, reduce or mitigate as many pointing uncertainties as possible. Alternatively, the uplink transmission beam may be a narrow beam that is scanned across the uncertainty region.

The uplink is modulated by the UL modem 243, and can carry identification and/or validation signals, as discussed above. Shortly (e.g., seconds) after transmission of the uplink from the optical receiver 150, the downlink telescope of the optical head 248 may detect a returned beam, spatially acquire and lock up with the returned beam, and subsequently acquire, demodulate, decode, and otherwise process the downlink data via the receiver 250. The processed data is stored in one or more local buffers 180.

The optical receiver 150 also includes a controller 242 ("controls module" or "control electronics," for example, including one or more microprocessors) to control uplink telescope and/or receiver pointing, connections to telemetry, uplink data flow and/or downlink data flow. The controller 242 of the optical receiver 150 can be configured to: (1) oversee the AO algorithm; (2) calculate and implement the pointing of the gimbal based on knowledge or an estimate (e.g., position, orbit, trajectory, velocity, etc.) of the optical transmitter 130; (3) calculate and create data transmission protocol signals; (4) coordinate activities of the integrated optical receiver 150; and/or (5) communicate with users and the ground data infrastructure.

A ground terminal 240 can include a GPS receiver or other means for determining its location, and may also include a star field tracker for determining its attitude. The optical receiver 150 can include a memory that stores information about the satellites it can communicate with, along with their present ephemeris and orbital parameters.

A ground terminal 240 can include a mechanical, electro-optic, or electronic turbulence mitigation system, which may use a small amount of the downlink power for its operation. The amount of the downlink power used by the turbulence mitigation system can depend upon the brightness of the received transmission from the space terminal and/or the duration of the link formed between the ground terminal 240 and the space terminal. Optical components of the optical receiver 150 can also include a weather protection subsystem, for example comprising one or more apertures that are opened and closed depending upon weather measurements from dedicated monitors.

As mentioned above, the receiver 150 may be disposed at a ground terminal, on a boat, on a spacecraft, or on an airplane. Space-borne receivers are positioned farthest from atmospheric turbulence, and so coupling from even a large space telescope into a fiber can be relatively straightforward.

However, far-field scintillation on the downlink can cause dropouts, and so multiple receive apertures, spaced apart from one another, can be used in space, in order to combat scintillation. That is, turbulence in the atmosphere causes the power in the downlink beam to have some spatial distribution. A single small aperture might be located in a (temporary) null of the far field power distribution and, thus, experience a fade. With multiple spatially separated small apertures, it becomes less likely that all apertures will be simultaneously located in nulls in the far field power distribution. So the total power collected by multiple apertures tends to fluctuate less than the power collected by one small aperture. Note that "small" in this discussion refers to the aperture size relative to the spatial coherence length of the atmosphere, which is typically about 1-20 cm.

Similar fading mitigation tradeoffs also exist when comparing systems that employ feed-forward, feedback, and modified optics designs. Ground terminals and other remote terminals can also include one or more receive apertures, depending upon the design.

Receiver/Remote Terminal Operation

Figure 2B:
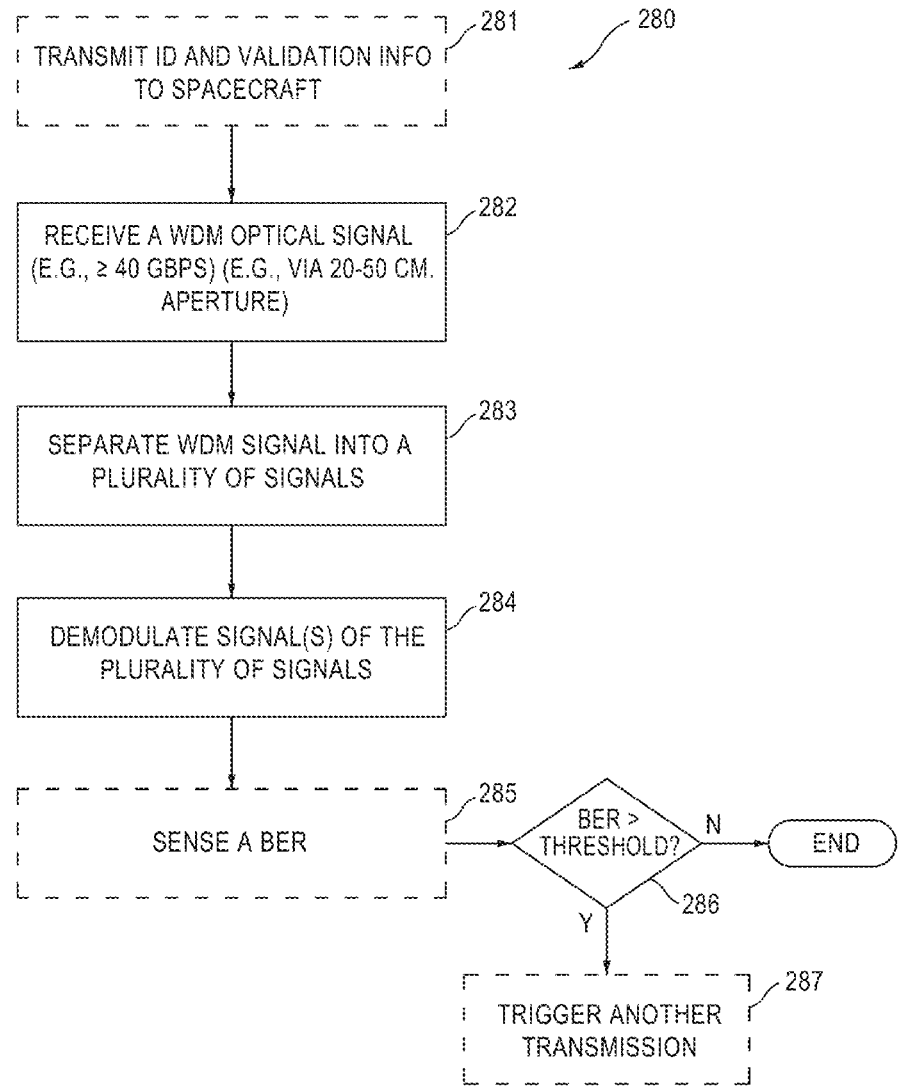
FIG. 2B is a flow diagram that illustrates free-space optical communications using the system shown in FIG. 1A.

FIG. 2B shows a free-space optical communications process 280 performed by the receiver side of the direct-link optical communications system 100 shown in FIG. 2A. During orbit of a spacecraft bearing an optical transmitter 130, a communications channel/link is established between the optical transmitter 130 and a remote terminal bearing a receiver 150. The optical transmitter 130 transmits a WDM optical signal via the communications link. The WDM optical signal is modulated, for example at a rate of at least about 40 Gbps, and is received at the receiver 150 (box 282) via an aperture at the optical head 248 having a diameter, for example, of about 20 cm to about 50 cm. Receiving the WDM optical signal can include coupling light from the optical head 248 to a wavelength-division demultiplexer via a single-mode fiber. Alternatively or in addition, receiving the WDM optical signal can include modulating a spatial phase profile of the WDM optical signal to compensate for atmospheric effects in the free-space optical communications channel.

Free-space optical communication described herein can be initiated by the remote/ground terminal first illuminating the space terminal with an uplink "beacon." In some implementations, the ground terminal transmits information, such as identification and validation information (box 281), via the beacon using the uplink modem 243. The ground terminal points the beacon at the space terminal, for example, based on predictions of the spacecraft location obtained through spacecraft tracking and/or updated with orbit corrections based on previous link acquisitions. The ground terminal beacon beam may be broad enough to cover its pointing uncertainty (arising, for example, due to ground terminal uncertainties and/or uncertainties in the spacecraft location), or a narrower beam may be scanned over the uncertainty region.

Data transmitted on the beacon may be used by the spacecraft for ID/authentication of the corresponding ground terminal. The spacecraft may validate this information and, if validation is successful, transmit the WDM optical signal to the ground terminal in response. In particular, the space terminal can point its acquisition sensor, such as a quadrant detector or camera, in the general direction of the ground terminal. The field of view of the acquisition sensor is larger than the spacecraft pointing uncertainty (the sensor field-of-view (FOV) is typically about 1 mad to several degrees).

When the ground terminal illuminates the space terminal, the space terminal registers the signal on the acquisition sensor and slews its pointing to correct for any errors, thereby pointing its narrow downlink beam back to the ground terminal while accounting for the relative motion of the terminals. For example, the correct pointing for the downlink may be different than the apparent direction from which the downlink signal is received (this is sometimes called "point ahead" or "look behind"). Once the space terminal is illuminating the ground terminal, the ground terminal begins tracking on the space terminal signal in order to couple the received downlink light transmitted from the space terminal into the ground terminal receive fiber. During downlink transmission, the uplink/beacon from the ground terminal may be used for supplemental purposes, such as to ensure reliable data delivery by sending a repeat request to the space terminal upon detection of code word errors in the downlink transmission.

Once the link has been established, the optical transmitter 130 transmits a WDM optical signal via the communications link. The receiver 150 separates the received WDM optical signal into a plurality of optical signals (box 283) and demodulates (e.g., coherently) at least one optical signal of the plurality of optical signals (box 284). In some cases, the receiver 150 is also configured to monitor transmission errors. For example, the receiver 150 detects or senses a bit error rate (BER) or other fidelity metrics of one or more signals of the plurality of optical signals (box 285) and determines whether the BER exceeds a predetermined threshold (box 286), if the BER exceeds a predetermined threshold, the receiver 150 triggers another transmission (box 287) from the spacecraft, of at least a portion of the WDM optical signal.

In other configurations, free-space optical communication is not initiated by the remote/ground terminal first illuminating the space terminal with a "beacon." For example, if the space terminal beam is broad enough that it could illuminate the ground terminal with substantial or completely certainty, given all of the various pointing uncertainties (s/c position and attitude knowledge, ground terminal position), the ground terminal uplink/beacon may be unnecessary. Note that since, as noted above, the uplink/beacon from the ground terminal may be used for purposes such as sending repeat requests, those tasks would have to be handled differently if there is no uplink/beacon (e.g. with stronger forward error correction codes that reduce the incidence of code word errors).

In most instances, operations are scheduled to occur based on ground terminal and space terminal locations so that the links occur when the geometry (e.g., elevation, link distance, etc.) permits. In other words, the acquisition process does not start until the space terminal reaches a specified elevation angle based on predictions of its location, and acquisition stops when the space terminal falls below the specified elevation angle.

Receive-Side Architectures

FIGS. 3-9 show example optical receiver architectures for the receiver 150 shown in FIGS. 1A and 2, As mentioned above, the receiver 150 may be disposed at a ground terminal, on a spacecraft, or on an airplane. Space-borne receivers are positioned farthest from atmospheric turbulence, and so coupling from even a large space telescope into a fiber can be relatively straightforward.

Single-Aperture Optical Receiver

Figure 3:
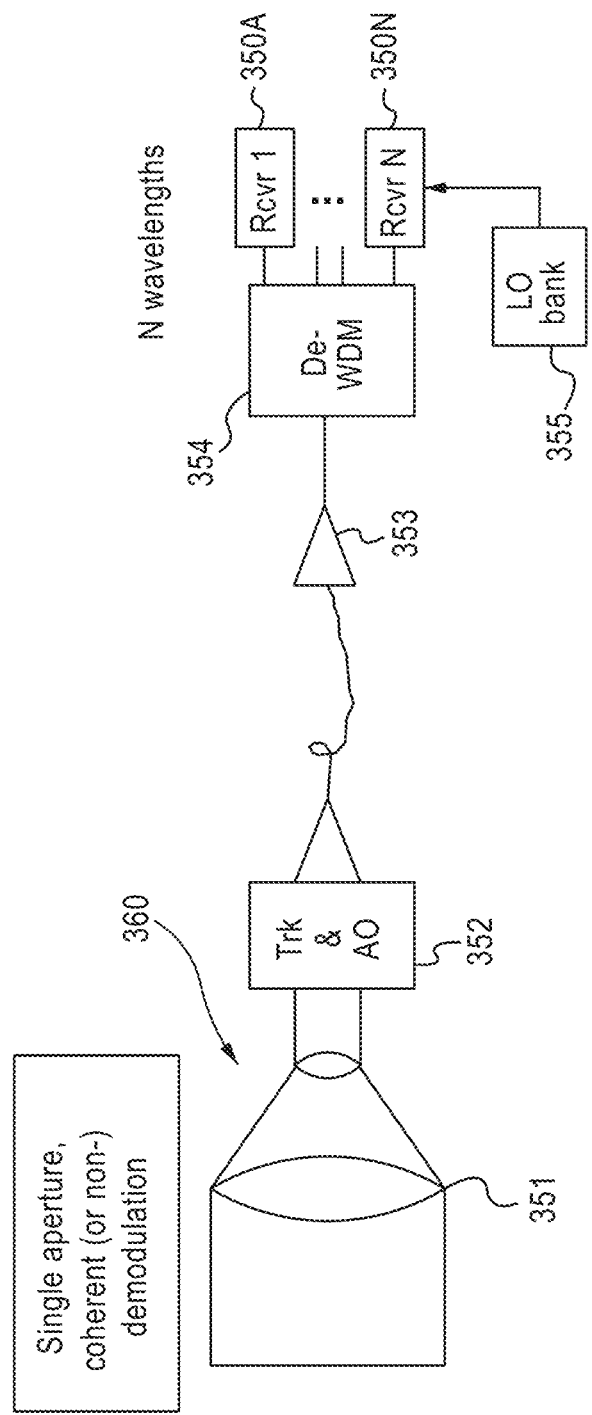
FIG. 3 is a schematic drawing of a receiver with a single aperture.

FIG. 3 is a schematic drawing of a receive-side architecture of a remote terminal including a single aperture defined by a telescope 350, for coherent or non-coherent demodulation, according to an embodiment. A received downlink signal (e.g., comprising a plurality of sub-channels) passes through a telescope 360, which couples the downlink signal into an adaptive optics (AO) sensor and tracking filter (e.g., a Kalman filter) 352 that applies one or more AO algorithms to the received signal before coupling it to a fiber. AO algorithms correct the optical effects of atmospheric turbulence, thereby enhancing the performance of the remote terminal. An optical amplifier 353 receives the fiber-bound, AO-corrected signal and pre-amplifies it before passing the signal to a demultiplexer (De-WDM) 354 that converts the single multiplexed incoming signal into a plurality of de-multiplexed signals (e.g., differently colored signals) that are fed to respective optical receivers 350A-350N. A local oscillator (LO) bank 355 is operatively coupled to the optical receivers 350A-350N and is configured to perform coherent (e.g., homodyne, heterodyne, or intradyne) detection down of the colored de-multiplexed signals received at the optical receivers 350A-350N. The receiver shown in FIG. 3 can also be used for non-coherent direction, such as direct detection or differential phase shift keying (DPSK). In some embodiments, feed-forward or feedback techniques may be added to the receive-side architecture of FIG. 3, for example to compensate for residual fading effects (e.g., from imperfect AO plus scintillation).

Multiple-Aperture Optical Receiver with Non-Coherent Combining and Demodulation

Figure 4:
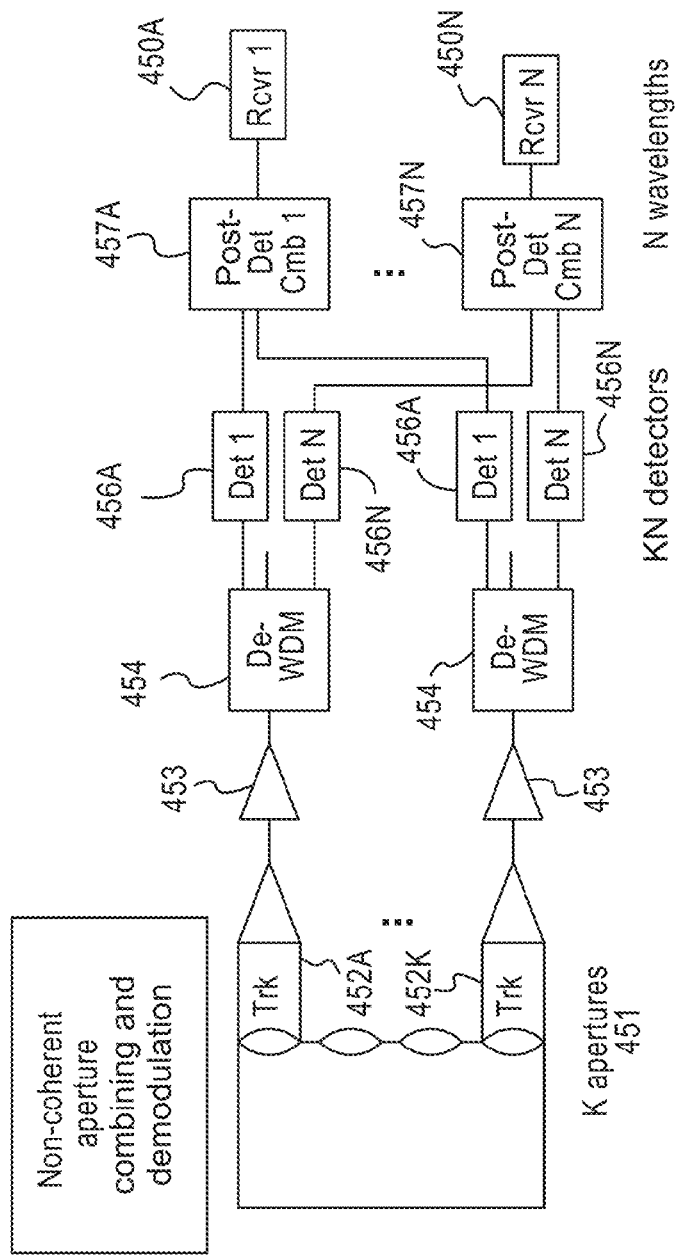
FIG. 4 is a schematic drawing of a receiver that includes several apertures and that is configured to perform non-coherent aperture combining and demodulation.

FIG. 4 is a schematic drawing of a receive-side architecture for a remote terminal, including a plurality of apertures 451 (e.g., each corresponding to a telescope) and configured to perform non-coherent aperture combining and demodulation (e.g., for direct detection or differentially coherent detection). A received downlink signal passes through the apertures 451, each of which is optically coupled to a corresponding tracking filter (452A-452K). Each filtered signal is coupled to a fiber optic channel and routed to a corresponding optical amplifier 453 for pre-amplification. Each pre-amplified signal is then de-multiplexed by a corresponding De-WDM 454 into several signal channels that are detected by detectors 456A-456N. In other words, the colors of each telescope's received signal are separated by the pre-amplified De-WDMs, and then each channel on each telescope is detected. At that point, "like" channels can be combined by post-detection combiners 457A-457N, for example, by summing the respective detector output voltages, or by digitizing and then digitally combining them, either by soft decision or hard decision decoding. The post-detection combiners 457A-457N output corresponding combined signals to receivers 450A-450N.

Multiple-Aperture Optical Receiver with Coherent Combining and Demodulation

Figure 5:
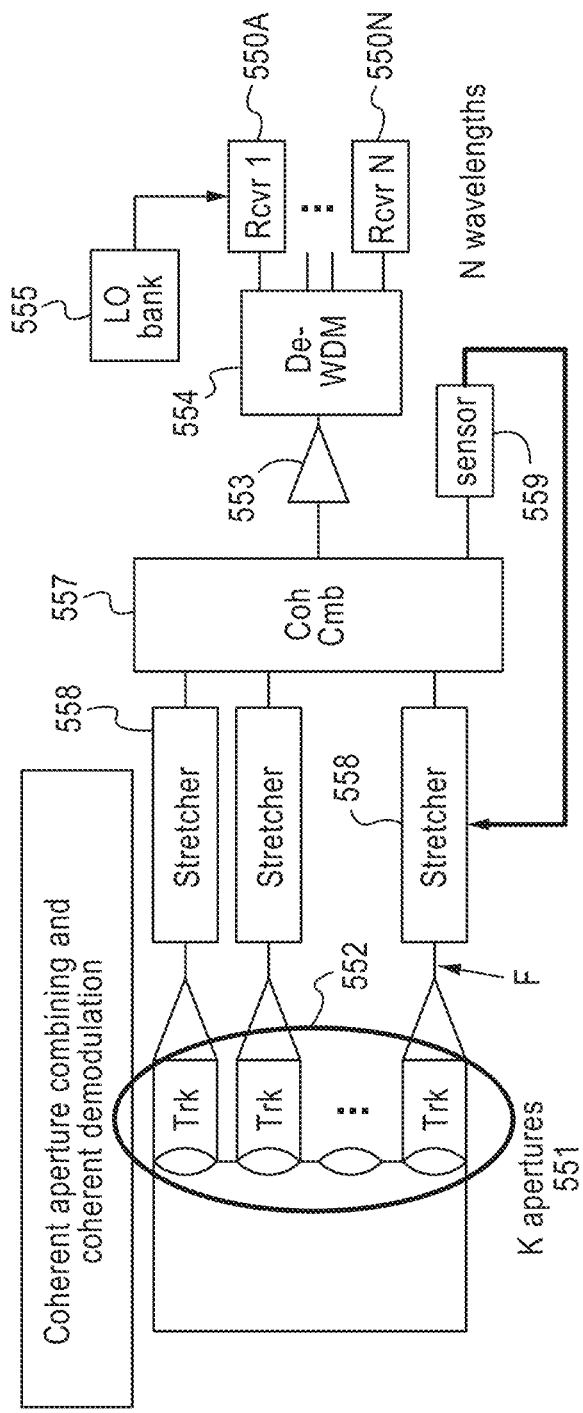
FIG. 5 is a schematic drawing of a receiver that includes several apertures optically coupled to respective optical stretchers and that is configured to perform coherent aperture combining (before amplification) and demodulation.

FIG. 5 is a schematic drawing of a receive-side architecture including apertures optically coupled to respective optical stretchers, and configured to perform coherent aperture combining and demodulation. A received downlink signal passes through the apertures 551, each of which is optically coupled to a tracking filter 552 that filters a portion of the incoming downlink signal into a plurality of filtered signals. Each filtered signal is coupled to a corresponding fiber optic channel ("F") for routing to a stretcher 558 or other delay element (e.g., a phase modulator) that delays the signal in time or phase, depending in part on the signal bandwidth and device geometry. For apertures mounted on a single gimbal (such that the path delay between the apertures does not vary with pointing angle), the stretcher 558 can be viewed as a providing variable phase delay that compensates for the relative phase between the apertures. For embodiments that might have the apertures on separate gimbals, the stretcher also compensates for angle-dependent relative time delay between the apertures.

A coherent beam combiner 557 coupled to the stretcher 558 combines the signals into a combined beam. The combined beam is fiber optically routed to a DeWDM 554 where it is de-multiplexed into colored signals that are fed to respective receivers 550A-550N; (i.e., a separate receiver for each color). A feedback loop, comprising a sensor 559 between the coherent beam combiner 557 and at least one stretcher 558 monitors the relative delay between the signals from the various apertures and adjust the corresponding stretcher(s) to compensate. A local oscillator (LO) bank 555 is operatively coupled to the receivers 550A-550N and is configured to perform a coherent down-conversion for one or more of the colored de-multiplexed signals received at the plurality of receivers 550A-550N.

Figure 6:
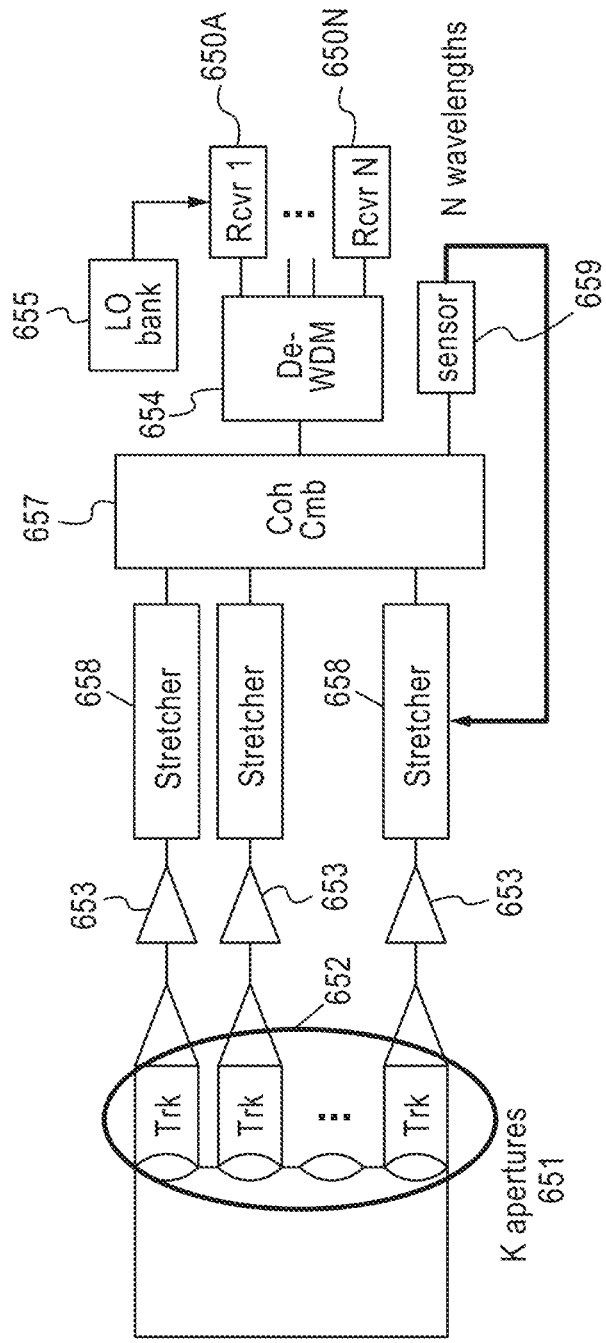
FIG. 6 is a schematic drawing of a receiver that includes several apertures optically coupled to respective optical amplifiers and optical stretchers and that is configured to perform coherent aperture combining (after amplification) and demodulation.

FIG. 6 is a schematic drawing of a receive-side architecture including multiple apertures optically coupled to respective optical amplifiers and optical stretchers, and configured to perform coherent aperture combining and demodulation, according to an embodiment. The architecture of FIG. 6 functions as described with reference to FIG. 5 above, with the exception that the pre-amplification (by optical amplifiers 653) occurs after each of the apertures 651 instead of after combining via the coherent beam combiner 657. The architecture in FIG. 6 may be used when the losses associated with the stretchers and the coherent combiner are not negligible.

Figure 7:
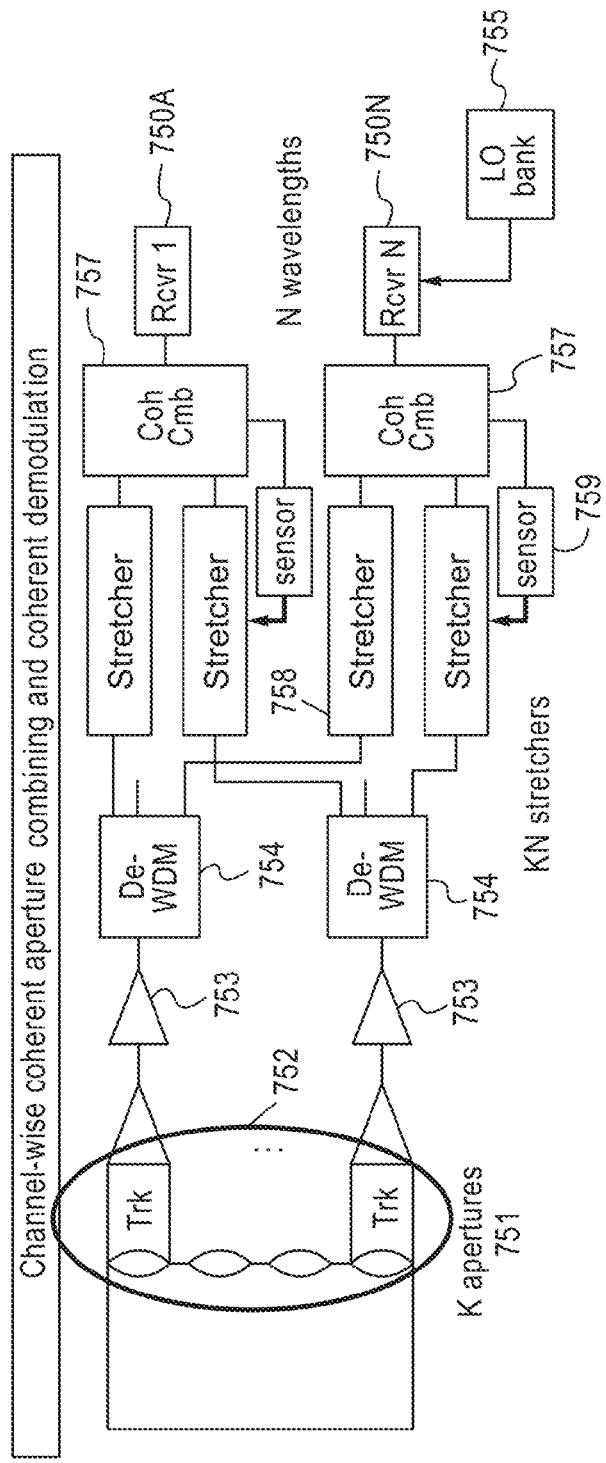
FIG. 7 is a schematic drawing of a receiver that includes several apertures and that is configured to perform channel-wise aperture combining and coherent optical demodulation.

Multiple-Aperture Optical Receiver with Channel-Wise Coherent Aperture Combining and Coherent Demodulation FIG. 7 is a schematic drawing of a receive-side architecture including many apertures, and configured to perform channel-wise aperture combining and coherent demodulation, according to an embodiment. A received downlink signal passes through the plurality of apertures 751 each optically coupled to a tracking filter 752 that filters a portion of the incoming downlink signal into a plurality of filtered signals. Each filtered signal is coupled to a corresponding fiber optic channel for routing to an optical amplifier 753 for pre-amplification. Each pre-amplified signal is then de-multiplexed by a corresponding De-WDM 754 into a plurality of signal channels that are each fiber-optically fed into respective stretchers 758 that apply phase adjustments to the signals, and "like" channels are combined by a coherent beam combiner 757 into a combined beam. In other words, wavelength de-multiplexing of the signal colors occurs near the apertures, a coherent optical combiner 757 is assigned for each color, and a single fiber for each color delivers its corresponding colored signal to a dedicated receiver 750A. 750N. A feedback loop, comprising a sensor 759, between each coherent beam combiner 757 and at least one corresponding stretcher 758 monitors the relative delay between the signals from the various apertures and adjust the corresponding stretcher(s) to compensate. The coherent combiners 757 output corresponding combined signals to optical receivers 750A-750N ("N" being the number of wavelengths). As in previous embodiments, a local oscillator (LO) bank 755 is operatively coupled to the plurality of optical receivers 750A-750N and is configured to perform a coherent down-conversion for one or more of the colored, de-multiplexed, combined signals received at/detected by the plurality of optical receivers 750A-750N.

Figure 8:
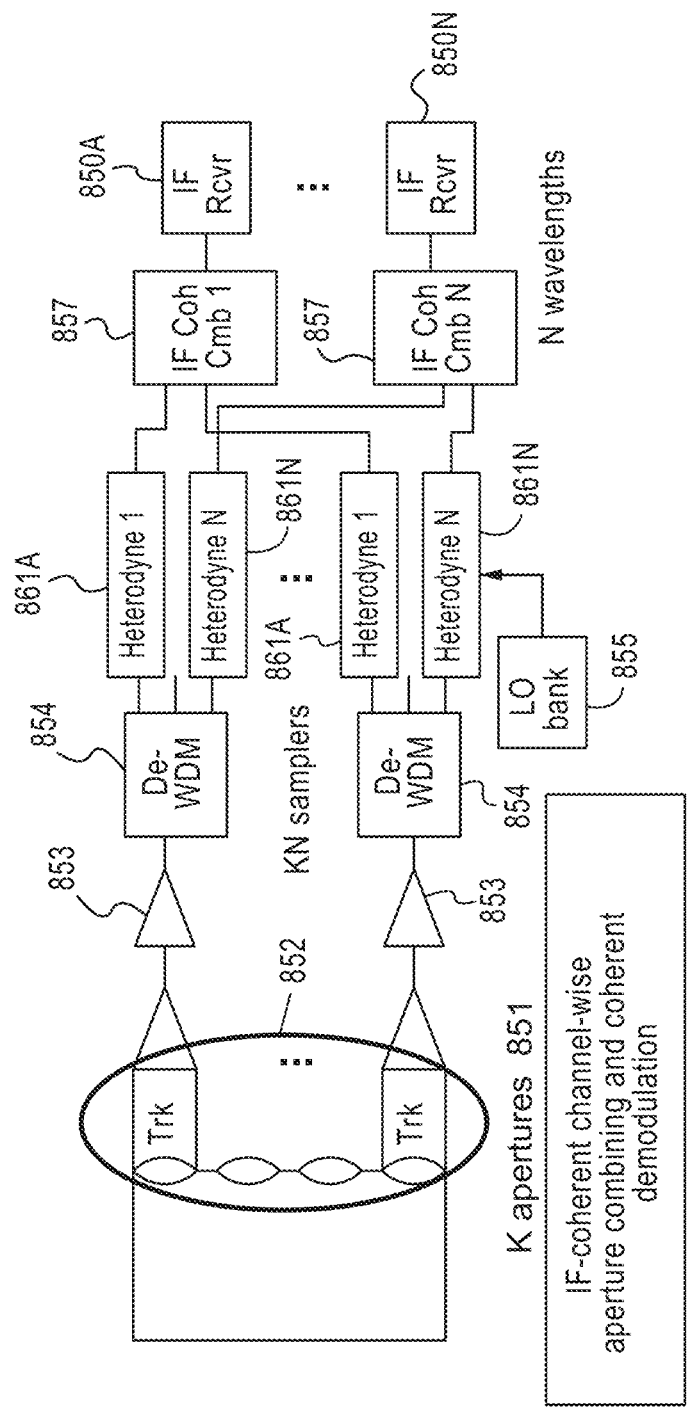
FIG. 8 is a schematic drawing of a receiver that includes several apertures and that is configured to perform intermediate frequency (IF) coherent channel-wise aperture combining and coherent demodulation performed electronically at the IF.

Multiple-Aperture Optical Receiver with Intermediate Frequency Channel-Wise Aperture Combining and Coherent Demodulation FIG. 8 is a schematic drawing of a receive-side architecture including a plurality of apertures, and configured to perform intermediate frequency (IF) coherent channel-wise aperture combining and coherent demodulation, according to an embodiment. A received downlink signal passes through the plurality of apertures 851 each optically coupled to a tracking filter 852 that filters a portion of the incoming downlink signal into a plurality of filtered signals. Each filtered signal is coupled to a corresponding fiber optic channel for routing to an optical amplifier 853 for pre-amplification. Each pre-amplified signal is then de-multiplexed by a corresponding De-WDM 854 into a plurality of colored signal channels that are each down-converted to an electrical IF signal by a corresponding heterodyne (861A-861N) in conjunction with LO bank 855. The IF signals are then coherently combined (by coherent combiners 857) in the electrical domain and received at a corresponding IF receiver for each arm (850A-850N), Because the down-conversion is to an electrical IF, the subsequent combining and processing is non-optical.

Multiple-Aperture Optical Receiver with Digitally Coherent Channel-Wise Aperture Combining and Coherent Demodulation FIG. 9 is a schematic drawing of a receive-side architecture including a plurality of apertures, and configured to perform digitally coherent channel-wise aperture combining and coherent demodulation, according to an embodiment. The architecture of FIG. 9 is similar to the architecture of FIG. 8, with the exception that each down-conversion (performed by LO bank 955) is I-Q sampled (973A-973N) and then all of the I-Q samples, corresponding to the plurality of apertures 951, are coherently combined digitally (at digital coherent combiners 957) before final demodulation.

Adaptive Optics to Compensate for Coupling Losses and Fading

As discussed above, atmospheric effects such as clouds, temperature gradients and turbulence can have deleterious effects on free-space optical transmissions, for example, such that light arriving at a receiver telescope of a remote terminal from an orbiting spacecraft is optically aberrated or distorted. To compensate for atmospheric effects, adaptive optics technologies can be implemented at the receiver. Adaptive optics can include, for example, a feedback loop that includes a wavefront sensor and deformable mirror, spatial light modulator, or other device for changing the spatial phase profile of the received optical signal. Because the remote terminal, during operation, slews at an angular velocity that exceeds that of typical astronomical observations (which slew at a much slower rate to compensate for the Earth's rotation), the bandwidths of the adaptive optic sensors and actuators should be large enough to compensate for the faster apparent changes in the atmosphere due to the fast slew rate.

Figure 10A:
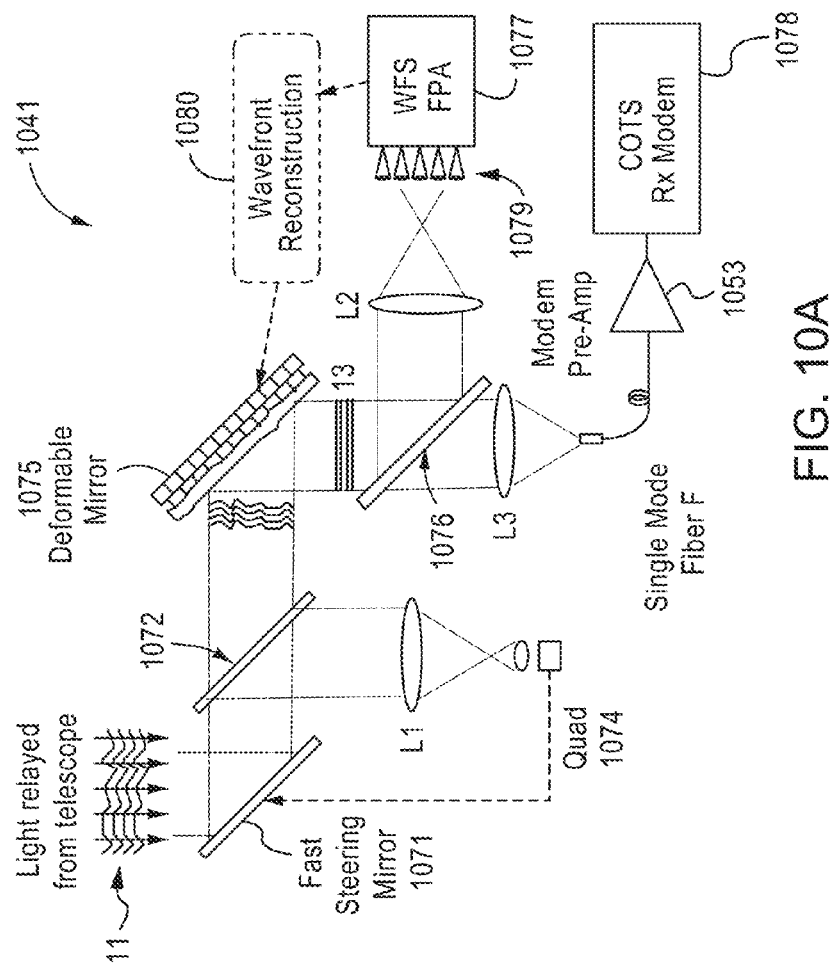
FIG. 10A is a block diagram showing components of an adaptive optics assembly suitable for use in a receiver at a remote terminal.

FIG. 10A is a block diagram showing components of an adaptive optics assembly 1041. As shown in FIG. 10A, a light beam 11, relayed from a telescope and which has been aberrated due to atmospheric effects, is incident on a fast steering mirror 1071 that is steered and/or otherwise controlled, via an electrical connection, by a quad cell detector 1074 so as to maximize the received signal. The incident light beam reflected off the fast steering mirror 1071 towards a beam splitter 1072 such that a first portion of the light beam is focused, via a lens onto the quad cell detector 1074, and a second portion of the light beam is transmitted to a deformable mirror 1075.

The deformable mirror 1075, under the control of a wavefront sensor focal plane array 1077, modulates the spatial phase profile of the incident beam 11 to remove or reduce the aberrations. It reflects a substantially or fully collimated beam 13 that is then routed to another beam splitter 1076. The other beam splitter 1076 splits the collimated beam 13 such that a first portion of the collimated beam is focused, via a lens L2, onto the wavefront sensor focal plane array 1077, and such that a second portion of the collimated beam is transmitted, focused via a lens L3, and coupled into a single-mode fiber that routes the beam, via a modem pre-amplifier 1053, to a receiver modem 1078.

The deformable mirror 1075 is controlled, via an electrical connection, by the wavefront sensor focal plane array 1077 (e.g., a Shack-Hartmann wavefront sensor), and is configured to accomplish wavefront reconstruction of a beam incident on the deformable minor 1075. More specifically, a lenslet array 1079 focuses different portions of the incident beam onto respective groups of sensor elements of the focal plane array 1077. A processor 1080 coupled to the focal plane array 1077 estimates the local tilts of the incident wavefront from the positions of the focused sports. These local tilts represent the aberration of the wavefront. The processor 1080 uses this estimate of the aberration to control actuators of the deformable mirror 1075 so as adjust their axial positioning to compensate for the detected aberration.

Other adaptive optics implementations are also possibly, including a much simpler fiber nutator that gives lesser, but possibly adequate, performance. With a fiber nutator, the phase corrections for various "sub-apertures" are dithered at distinguishable frequencies. The power coupled to the fiber can then be monitored at each of those frequencies and used to optimize each of the phase corrections. This works well for reasonably small numbers of "sub-apertures" small (or, equivalently, if D/r0 is not to large) and the phase correctors can dither at a frequency higher than the bandwidth of the corrections. It has the advantage of not requiring a high-speed camera as the power coupled to the fiber is used to monitor all signals.

Figure 10B:
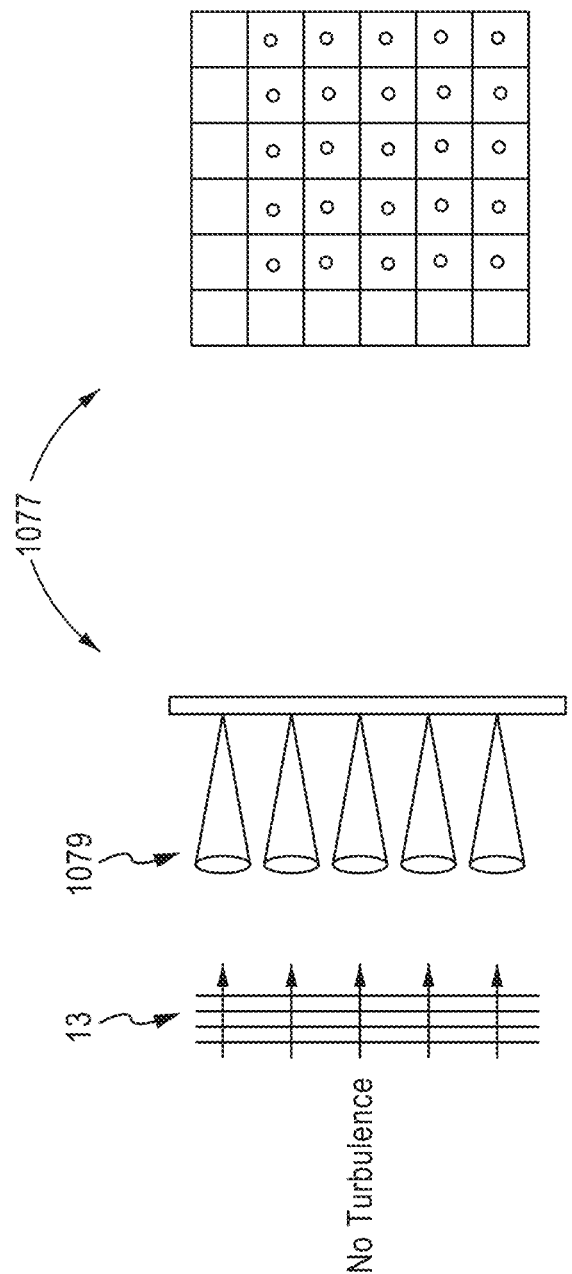
FIG. 10B is a rendering of the wavefront sensor of FIG. 10A sensing an unaberrated wavefront.

FIG. 10B is a rendering of the wavefront sensor 1077 of FIG. 10A sensing a wavefront with no turbulence. Without turbulence, the beam incident on the lenslet array 1079 is substantially or fully collimated. Under such conditions, the lenslets 1079 subdivide and focus the incident light beam into a plurality of regularly arrayed spots that are centered or nearly centered on each corresponding group of sensor elements of the focal plane array 1077.

Figure 10C:
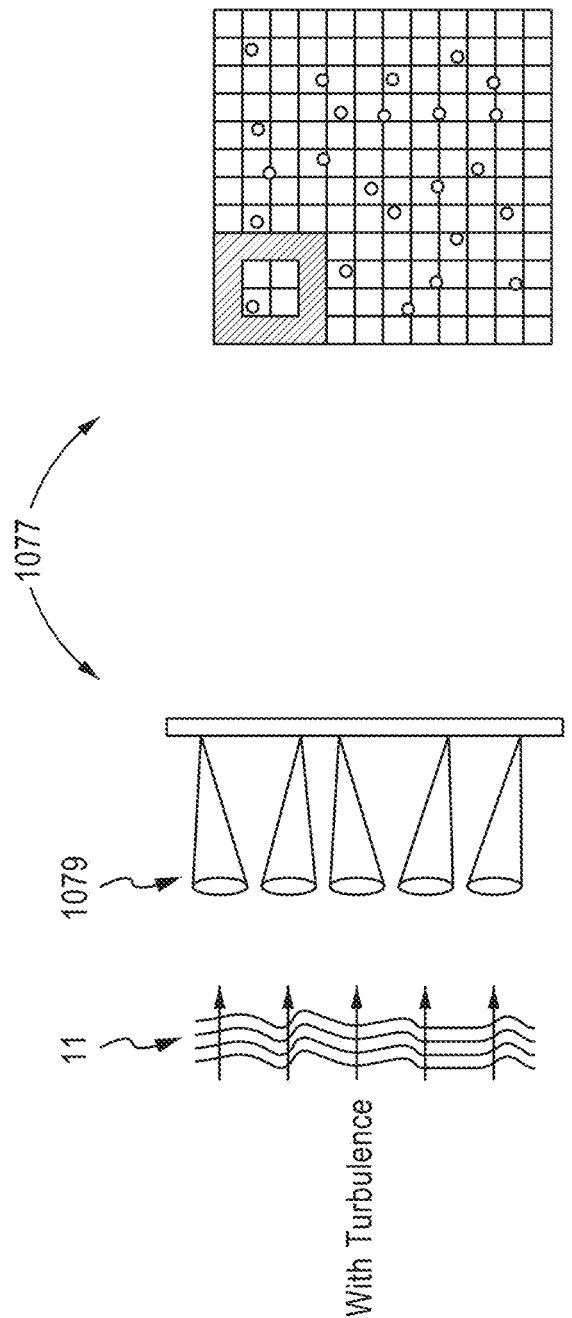
FIG. 10C is a rendering of the wavefront sensor of FIG. 10A sensing a wavefront aberrated by atmospheric turbulence.

By contrast, FIG. 10C shows the wavefront sensor of FIG. 10A sensing an aberrated wavefront. As shown, the incoming beam 11 is aberrated, for example, due to atmospheric conditions such as clouds and/or air turbulence. Under such conditions, the lenslets 1079 subdivide and focus the incident light beam into a plurality of spots that are scattered across the focal plane array 1077 in a non-uniform pattern. The processor 1080 calculates the distance and direction of each spot from its nominal position (shown in FIG. 10B) and uses them to estimate the phase aberration of the incident beam 11, as well as the corresponding actuator control corrections to be applied to the deformable mirror 1075, as shown in the control loop of FIG. 10D.

Figure 10E:
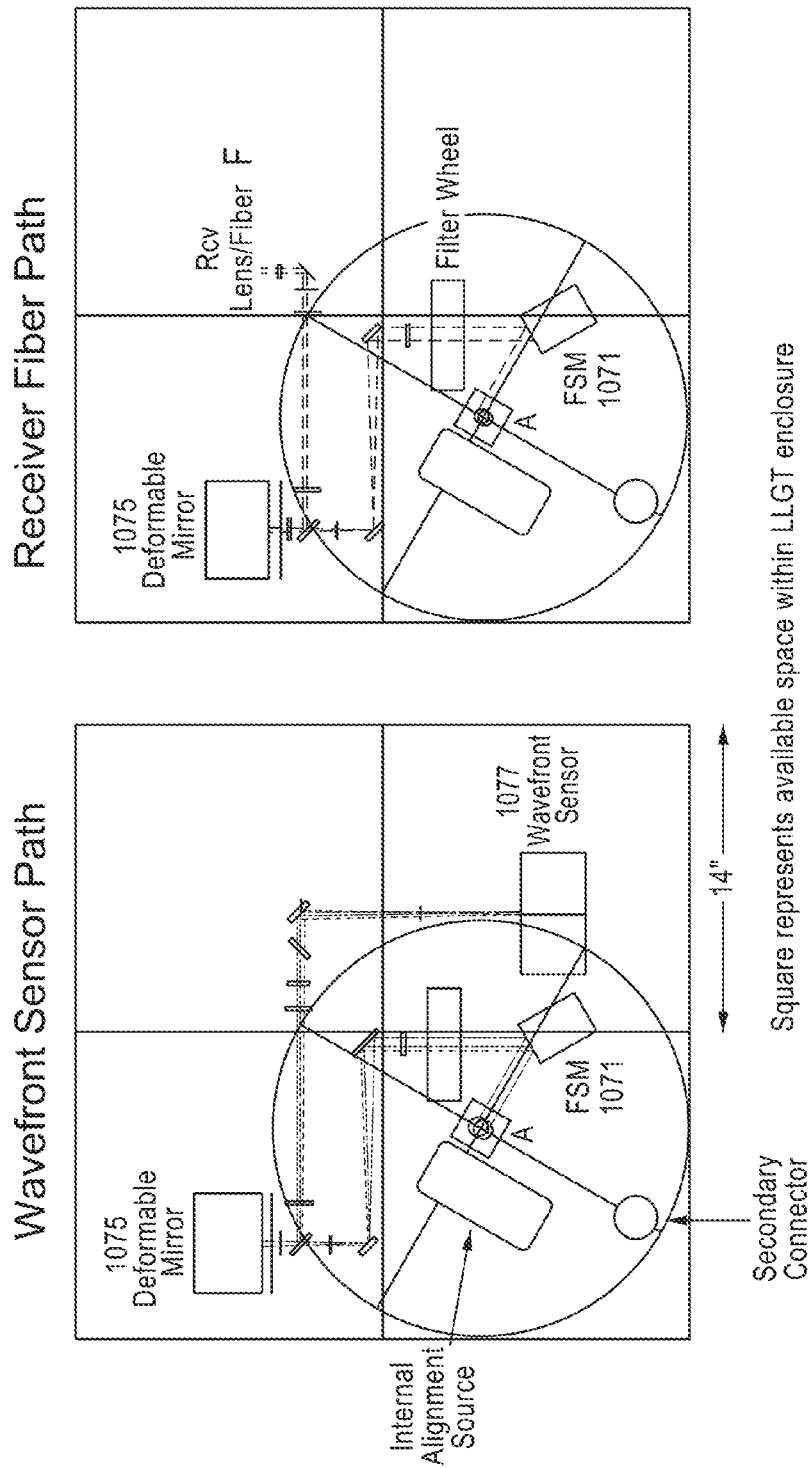
FIG. 10E includes schematic drawings of the adaptive optics assembly of FIG. 10A on a telescope in a receiver at a remote terminal.

The schematic drawings of FIG. 10E show the adaptive optics assembly of FIG. 10A, as situated on the back end of a 10-100 cm (e.g., 40 cm) telescope suitable for use in a remote terminal. (The optical axis of the telescope is perpendicular to the plane of FIG. 10E.) As shown in the left-hand schematic, depicting the wavefront sensor optical circuit, the incident light beam enters the center aperture "A" (out-of-plane of the drawing) and is optically routed to the fast steering minor 1071, the deformable mirror 1075, and the wavefront sensor 1077, in the sequence disclosed above. The left-hand schematic depicts the receive fiber path, comprising the fast steeling mirror 1071, the deformable mirror 1075, and the receiver lens and fiber F, in sequence.

Figure 11A:
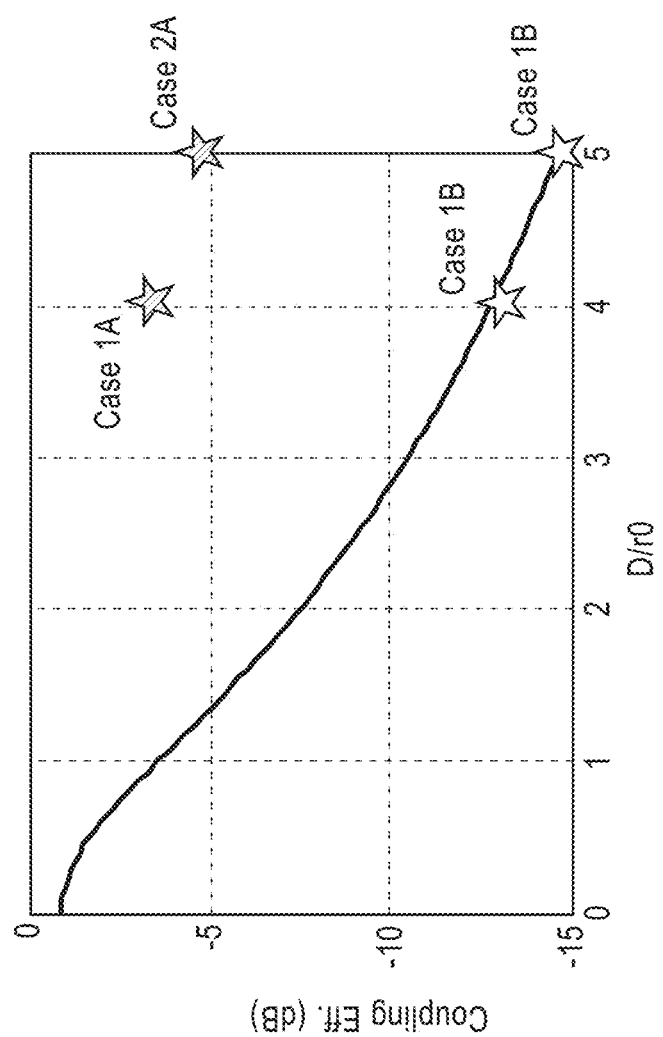
FIG. 11A is a plot showing average coupling loss versus the ratio of aperture diameter D to spatial coherence length r0 in atmosphere for light entering a telescope and an optical fiber for a nominal atmosphere (Case 1) and a stressing atmosphere (Case 2).
Figure 11B:
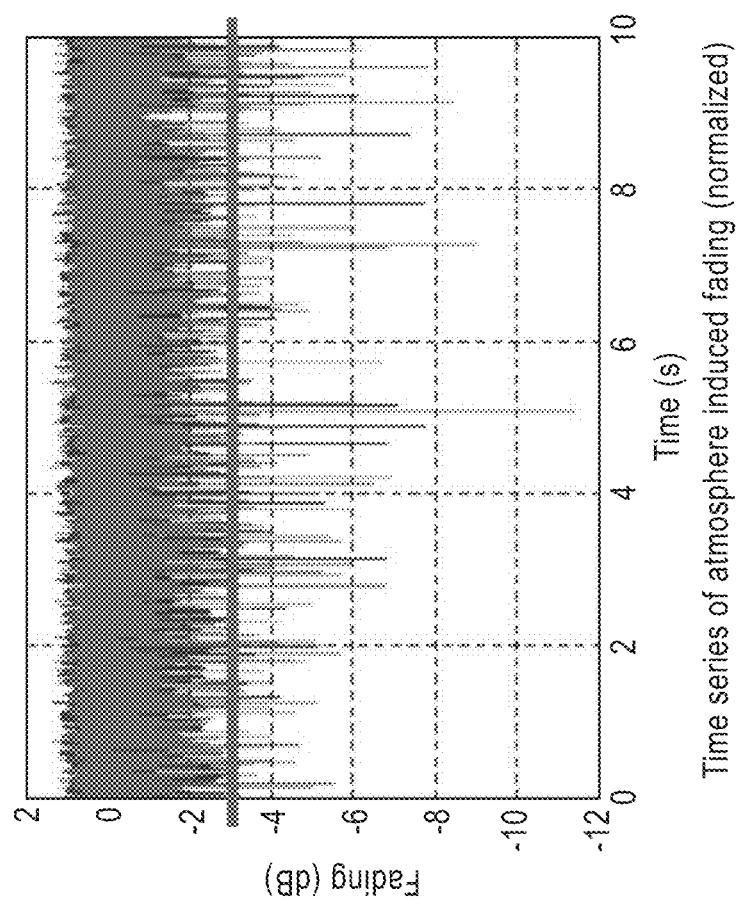
FIG. 11B is a plot showing time variation of coupling losses for the nominal and stressing atmospheres of FIG. 11A.
Figure 11C:
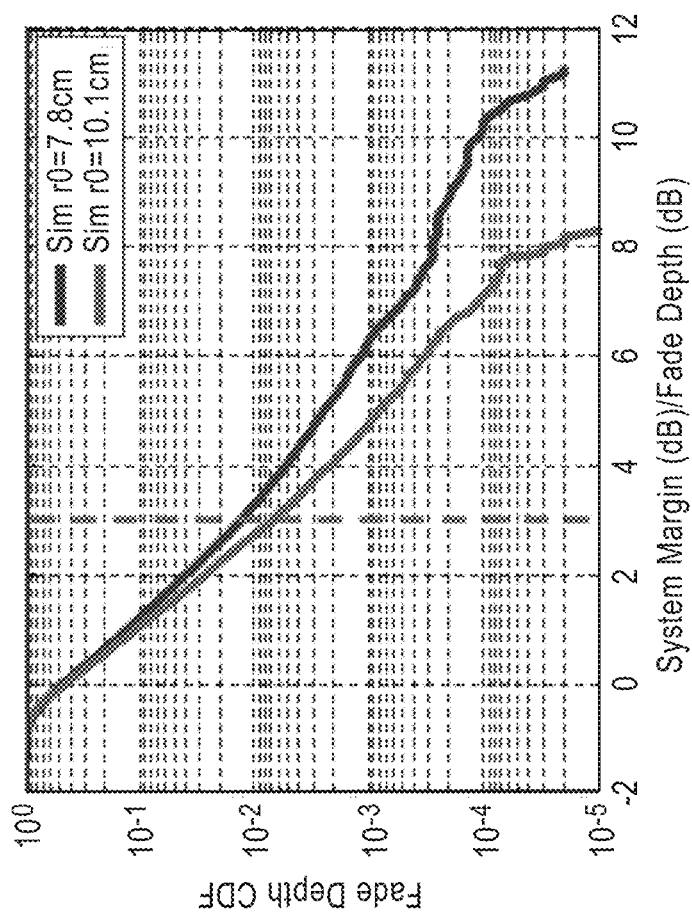
FIG. 11C is a plot showing distribution functions for fade depths for the nominal and stressing atmospheres of FIG. 11A.

FIGS. 11A-11C illustrate simulated effects of atmospheric turbulence on coupling efficiency and fading. They also showed simulated performance improvements using adaptive optics like those shown in FIGS. 10A-10E.

The curve in FIG. 11A depicts the average coupling loss between light entering a telescope and an optical fiber when only tilt tracking, via an FSM, is used to compensate for atmospheric distortions. In this plot, D is the telescope's aperture diameter and r0 is the spatial coherence length in the atmosphere, sometimes referred to as the Fried parameter. As the ratio D/r0 becomes large, the coupling loss becomes large. For example, for a 40-cm aperture, the stars labelled "Case 1A" and "Case 2A" correspond to two different atmospheres, respectively: a "nominal" atmosphere in Which r0=10.1 cm, and a "stressing" atmosphere in Which r0=7.8 cm (i.e., a reduced spatial coherence length). The curve shows that the coupling loss to the fiber would be about 12-15 dB in those cases. The stars labelled "Case 1B" and "Case 2B" represent what could be achieved with additional adaptive optics (including a deformable mirror and wavefront sensor) for the same nominal and stressing atmospheres, respectively. As can be seen in FIG. 11A, the coupling efficiency under the same respective conditions as Cases 1A and 2A is greatly improved (by about 10 dB) with additional adaptive optics in Cases 1B and 2B.

Atmospheric effects can also reduce the power of the transmitted light beam and/or cause "dropouts" during which transmitted data is not received at all. To compensate for such effects, forward error correction (FEC) can be implemented at the optical receiver and/or the optical transmitter as described above.

FIG. 11B shows a simulation of the time-variation of the coupling losses (normalized to the average coupling loss at 0 dB) for the nominal and stressing atmospheres of FIG. 11A. The gray curve is Case 1 (nominal) and the black curve is Case 2 (stressing). The bold horizontal line shows the receiver threshold, assuming that the link has 3 dB of margin on the average power. When the gray and black curves drop below the bold horizontal line, the received power is below the threshold power of the receiver and bit errors or frame errors are likely to be present. The system may correct for these with FEC techniques (see, e.g., the discussion of box 167 of FIG. 1B above) and/or feedback protocols used to retransmit frames that have errors.

FIG. 11C is a plot showing cumulative distribution functions for fade depths for the nominal and stressing atmospheres of FIG. 11A. The vertical dashed line at 3 dB shows the fades that go below the receiver threshold for a system designed with 3 dB of margin on the average power. The curves show that under the stressing atmospheric conditions, the power drops below this threshold about 1% of the time, and under the nominal atmospheric conditions, the power drops below this threshold about 0.6% of the time. These percentages determine what FEC and/or feedback protocols may be used to provide reliable data deliver over the channel.

Conclusion

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no in ore than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of designing and making the technology disclosed herein may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes (e.g., of designing and making the technology disclosed above) outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. An apparatus for receiving a modulated optical signal transmitted from a spacecraft in low-Earth orbit (LEO) or medium-Earth orbit (MEO) via a free-space optical communications channel, the apparatus comprising:
    a controller to determine when the spacecraft will reach a predetermined angle above a horizon;
    an uplink transmitter, operably coupled to the controller, to tripper transmission of the modulated optical signal by the spacecraft when the spacecraft reaches the predetermined angle above the horizon so as to reduce coupling loss of the modulated optical signal due to atmospheric turbulence;
    at least one telescope to receive the modulated optical signal from the spacecraft via the free-space optical communications channel, the modulated optical signal being modulated at a rate of at least 40 Gigabits per second (Gbps);
    a single-mode waveguide, in optical communication with the at least one telescope, to guide the modulated optical signal;
    an optical amplifier, in optical communication with the single-mode waveguide, to amplify the modulated optical signal; and
    a receiver, in optical communication with the optical amplifier, to demodulate the modulated optical signal at a rate of at least 40 Gbps.

2. The apparatus of claim 1, wherein the at least one telescope defines at least one aperture having a diameter from 10 centimeters to 100 centimeters.

3. The apparatus of claim 1, wherein the at least one telescope comprises a plurality of apertures, each of which receives a corresponding portion of the modulated optical signal.

4. The apparatus of claim 1, wherein the modulated optical signal comprises a wavelength-division multiplexed (WDM) optical signal and the receiver comprises:
    a wavelength-division demultiplexer, in optical communication with the optical amplifier, to separate the WDM optical signal into a plurality of optical signals; and
    a plurality of detectors, in optical communication with the wavelength-division demultiplexer, to demodulate the plurality of optical signals.

5. The apparatus of claim 1, wherein the uplink transmitter is further configured to transmit identification and validation information to the spacecraft.

6. The apparatus of claim 1, wherein the predetermined angle is at least 20 degrees above the horizon.

7. The apparatus of claim 5, wherein:
    the controller is operably coupled to the receiver and the uplink transmitter and is configured to sense at least one error associated with the modulated optical signal, and
    the uplink transmitter is configured to trigger another transmission, by the spacecraft, of at least a portion of the modulated optical signal in response to the at least one error.

8. The apparatus of claim 1, further comprising:
    an adaptive optical element, in optical communication with the at least one telescope and the single-mode waveguide, to modulate a spatial phase profile of the modulated optical signal so as to compensate for atmospheric effects in the free-space optical communications channel.

9. The apparatus of claim 1, further comprising:
    a coherent source, in optical communication with the receiver, to coherently demodulate the modulated optical signal.

10. A method of free-space optical communication with a spacecraft in low-Earth orbit (LEO) or medium-Earth orbit (MEO), the method comprising:
    determining when the spacecraft will reach a predetermined angle above a horizon during an orbit;
    triggering transmission of a modulated optical signal by the spacecraft when the spacecraft reaches the predetermined angle above the horizon so as to reduce coupling loss of the modulated optical signal due to atmospheric turbulence;
    receiving the modulated optical signal transmitted from the spacecraft via a free-space optical communications channel, the modulated optical signal being modulated at a rate of at least about 40 Gigabits per second (Gbps):

amplifying the modulated optical signal; and demodulating the modulated optical signal at a rate of at least 40 Gbps.

11. The method of claim 10, wherein receiving the modulated optical signal comprises collecting light via at least one aperture having a diameter from 10 centimeters to 100 centimeters.

12. The method of claim 10, wherein receiving the modulated optical signal comprises coupling light from a telescope to a single-mode waveguide.

13. The method of claim 10, wherein receiving the modulated optical signal comprises modulating a spatial phase profile of the modulated optical signal so as to compensate for atmospheric effects in the free-space optical communications channel.

14. The method of claim 10, wherein the modulated optical signal comprises a wavelength-division multiplexed (WDM) optical signal, and wherein receiving the modulated optical signal comprises separating the WDM optical signal into a plurality of optical signals.

15. The method of claim 14, wherein demodulating the modulated optical signal comprises demodulating each optical signal in the plurality of optical signals.

16. The method of claim 15, wherein demodulating the plurality of optical signals comprises coherently demodulating at least one optical signal.

17. The method of claim 10, further comprising:
transmitting identification and validation information to the spacecraft prior to receiving the modulated optical signal.

18. The method of claim 10, wherein triggering transmission of the modulated optical signal by the spacecraft occurs when the spacecraft is at an elevation of at least 20 degrees above the horizon.

19. The method of claim 10, further comprising:
sensing at least one error associated with the modulated optical signal; and
triggering another transmission, by the spacecraft, of at least a portion of the modulated optical signal in response to the at least one error.

20. The method of claim 10, further comprising:
ending transmission of the modulated optical signal when the spacecraft falls below a specified elevation angle.

\* \* \* \* \*